United States Patent
Fujiwara et al.

(10) Patent No.: US 8,663,426 B2
(45) Date of Patent: Mar. 4, 2014

(54) METHOD FOR PRODUCING CELLULOSE-FIBER FLAT STRUCTURE

(75) Inventors: Tsuyoshi Fujiwara, Yokohama (JP); Naohide Ogita, Yokohama (JP); Takashi Kawamukai, Tokyo (JP)

(73) Assignees: Mitsubishi Chemical Corporation, Tokyo (JP); Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 13/575,390

(22) PCT Filed: Feb. 1, 2011

(86) PCT No.: PCT/JP2011/052038
§ 371 (c)(1),
(2), (4) Date: Jul. 26, 2012

(87) PCT Pub. No.: WO2011/093510
PCT Pub. Date: Aug. 4, 2011

(65) Prior Publication Data
US 2012/0298319 A1 Nov. 29, 2012

(30) Foreign Application Priority Data
Feb. 1, 2010 (JP) ................................ 2010-020434

(51) Int. Cl.
*D21H 25/00* (2006.01)
*D21H 27/08* (2006.01)
*B01D 39/16* (2006.01)
*B01D 39/18* (2006.01)
*D02G 3/00* (2006.01)
*D03D 15/00* (2006.01)

(52) U.S. Cl.
USPC ........... 162/157.7; 162/9; 162/13; 162/157.1; 162/206; 162/903; 139/383 R; 139/420 A; 139/420 B; 210/500.1; 428/221; 428/401

(58) Field of Classification Search
USPC .......... 162/9, 12, 13, 21, 23, 100, 158, 164.1, 162/202, 289, 204–207, 218–227, 348, 162/358.1, 358.2, 900, 903, 151.1, 151.7; 139/383 A, 383 R, 420 A, 420 R, 420 B; 428/221, 364, 401; 210/400–404, 210/500.1
See application file for complete search history.

(56) References Cited

U.S. PATENT DOCUMENTS

| | | | | |
|---|---|---|---|---|
| 3,915,202 A | * | 10/1975 | Curtis et al. | 139/425 A |
| 4,149,571 A | * | 4/1979 | Burroughs | 139/383 A |
| 2007/0207692 A1 | * | 9/2007 | Ono et al. | 442/327 |
| 2010/0272980 A1 | * | 10/2010 | Kowata et al. | 428/220 |
| 2011/0117319 A1 | * | 5/2011 | Yano et al. | 428/141 |

FOREIGN PATENT DOCUMENTS

| | | | |
|---|---|---|---|
| EP | 2226171 A1 | 9/2010 | |
| JP | A-2006-193858 | 7/2006 | |
| JP | A-2006-316253 | 11/2006 | |
| JP | A-2009-299043 | 12/2009 | |
| WO | WO 2009/081881 A1 | 7/2009 | |
| WO | WO 2009108597 A1 * | 9/2009 | D21F 1/00 |

OTHER PUBLICATIONS

International Search Report issued in corresponding Application No. PCT/JP2011/052038 on Apr. 26, 2011.

* cited by examiner

*Primary Examiner* — Dennis Cordray
(74) *Attorney, Agent, or Firm* — Knobbe Martens Olson & Bear LLP

(57) ABSTRACT

The present invention relates to a method of producing a cellulose-fiber flat structure, the method including obtaining a cellulose-fiber flat structure by filtering a fine cellulose-fiber dispersion containing fine cellulose fibers having an average fiber diameter of 4 to 100 nm, using a filter material having a water permeability of not more than 100 ml/m²·s and an initial tensile modulus of 20 MPa or greater. The present invention is able to produce a cellulose-fiber flat structure by efficiently recovering fine cellulose fibers from a dispersion containing fine cellulose fibers having an average fiber diameter at the nano level. The method of producing a cellulose-fiber flat structure can also be applied to a continuous process.

17 Claims, 5 Drawing Sheets

METHOD FOR PRODUCING CELLULOSE-FIBER FLAT STRUCTURE

This application is the U.S. National Phase under 35 U.S.C. §371 of International Application PCT/JP2011/052038, filed Feb. 1, 2011, designating the U.S., and published in Japanese as WO 2011/093510 on Aug. 4, 2011, which claims priority to Japanese Patent Application No. 2010-020434, filed Feb. 1, 2010, the content of which is incorporated herein by reference in its entirety.

TECHNICAL FIELD

The present invention relates to a method of producing a cellulose-fiber flat structure, and more specifically, relates to a method in which, by filtering a dispersion containing cellulose fibers having a fiber diameter that is narrower than the wavelength of visible light using a prescribed filter material, a cellulose-fiber flat structure composed of fine cellulose fibers can be obtained with good productivity.

Priority is claimed on Japanese Patent Application No. 2010-020434, filed Feb. 1, 2010, the content of which is incorporated herein by reference.

BACKGROUND ART

Generally, glass plates are widely used as the substrates for displays such as liquid crystal and organic EL displays. However, glass plates have a large specific gravity and are difficult to reduce in weight, and also suffer from other drawbacks such as being susceptible to breakage, unable to bend, and requiring a predetermined thickness. As a result, in recent years, plastic substrates that can replace glass plates are being investigated. Specifically, display substrates using polycarbonate, polyethylene naphthalate or polyethylene terephthalate are now being used.

However, these conventional plastic materials for replacing glass have a large coefficient of linear expansion compared with a glass plate, and therefore during the process of depositing a device layer such as a thin film transistor on the substrate at high temperature, problems such as warping, cracking of the deposited film, and semiconductor disconnection tend to occur readily, meaning practical application of such plastic materials has proven difficult.

In other words, for these applications, a plastic material having high transparency, high heat resistance, low water absorption and a low coefficient of linear expansion is required.

In recent years, materials that use cellulose have been proposed as materials having these types of properties. Specifically, Patent Document 1 discloses that a composite composed of a nonwoven fabric containing cellulose and a resin other than cellulose exhibits excellent heat resistance, transparency and coefficient of linear expansion. Further, Patent Document 2 discloses a fiber composite, which contains cellulose fibers having an average fiber diameter of not more than 30 nm and a matrix material, and displays prescribed optical properties, and it can be anticipated that by using cellulose fibers having an ultra fine fiber diameter at the nanometer level, composites having even superior performance should be obtainable.

On the other hand, in these documents, the method used for obtaining the composite uses a technique in which, first, a dispersion containing the cellulose is filtered (papermaking) to produce a nonwoven fabric composed of cellulose, and the nonwoven fabric is subsequently complexed with another material.

DOCUMENTS OF RELATED ART

[Patent Document 1] Japanese Laid-Open Application No. 2006-316253
[Patent Document 2] International Patent Publication, WO 2009/081881 pamphlet

DISCLOSURE OF INVENTION

Problems to be Solved by the Invention

In Patent Document 1, when the dispersion containing the dispersed cellulose having an average diameter of several tens of μm is filtered (papermaking), a specific filter fabric made of polyethylene terephthalate having a prescribed pore diameter is used.

The inventors of the present invention found that when the filter material (filter fabric) specifically disclosed in Patent Document 1 was used to filter a dispersion containing cellulose fibers having a nano level average diameter, the majority of the cellulose fibers existed in the filtrate, meaning it was not possible to efficiently recover fine cellulose fibers from a dispersion using this filter fabric.

On the other hand, in Patent Document 2, a specific polytetrafluoroethylene (PTFE) porous film is used for filtering the cellulose fiber dispersion.

When the inventors of the present invention investigated filtering performance using the above PTFE filter material and a support material (such as a mesh net) for supporting the filter material, they found that although cellulose fibers having a nano level average diameter could be recovered from the dispersion, the surface texture of the support material was transferred to the surface of the obtained cellulose-fiber flat structure. As a result of this transferred surface texture, fluctuations in the optical properties and the like occurred within the structure, and as a result, application of the structure to displays and the like was limited, meaning further improvements are necessary in relation to this type of transfer.

Further, PTFE filter materials of the type described above are generally expensive, and use of them on a large scale level is impractical from both industrial and economic viewpoints. Furthermore, the surface area of commercially available PTFE porous films is generally only several tens of cm$^2$, and therefore there are also limits to the application of such porous films from an industrial productivity viewpoint, including an inability to use such films in continuous processes.

The present invention takes the above circumstances into consideration, and has an object of providing a method of producing a cellulose-fiber flat structure, which can efficiently recover fine cellulose fibers from a dispersion containing fine cellulose fibers having a nano level average fiber diameter, can produce a cellulose-fiber flat structure having a favorable surface texture, and can be applied to continuous processes and the like, as well as providing a cellulose-fiber flat structure obtained using the above method, a cellulose-fiber composite obtained using the cellulose-fiber flat structure, and a method of producing the cellulose-fiber composite.

Means to Solve the Problems

The inventors of the present invention focused their attention on conventionally used filter materials, and investigated the problems associated with those filter materials. As a result of intensive investigation, they discovered that by using a filter material having specific properties, they were able to achieve the above object.

In other words, the present invention includes the aspects described below.

<1> A method of producing a cellulose-fiber flat structure, the method including obtaining a cellulose-fiber flat structure by filtering a fine cellulose-fiber dispersion containing fine cellulose fibers having an average fiber diameter of 4 to 100 nm, using a filter material having a water permeability of not more than 100 ml/m²·s and an initial tensile modulus of 20 MPa or greater.

<2> The method of producing a cellulose-fiber flat structure according to <1>, wherein the filter material is formed from at least one type of fiber selected from the group consisting of synthetic resin fibers, regenerated fibers and natural fibers.

<3> The method of producing a cellulose-fiber flat structure according to <1> or <2>, wherein the filter material is obtained by subjecting a fabric formed using a fiber having an average thread thickness of 1 to 5 d/f to a heat and pressure treatment.

<4> The method of producing a cellulose-fiber flat structure according to <3>, wherein the thickness of the fabric is 100 μm or greater.

<5> The method of producing a cellulose-fiber flat structure according to <3> or <4>, wherein the fabric is a woven fabric, a knitted fabric or a nonwoven fabric.

<6> The method of producing a cellulose-fiber flat structure according to <1>, wherein the filter material is formed from a paper base material.

<7> The method of producing a cellulose-fiber flat structure according to <6>, wherein the paper base material has a thickness of 90 μm or greater.

<8> The method of producing a cellulose-fiber flat structure according to any one of <2> to <5>, wherein the fiber is a splittable composite fiber.

<9> The method of producing a cellulose-fiber flat structure according to any one of <1> to <8>, wherein the method includes, prior to obtaining the cellulose-fiber flat structure by performing filtering using the filter material, performing a fibrillation treatment on a raw material dispersion containing a dispersed cellulose, thereby obtaining the fine cellulose-fiber dispersion.

<10> A cellulose-fiber flat structure, obtained using the method of producing a cellulose-fiber flat structure according to any one of <1> to <9>.

<11> A cellulose-fiber composite, obtained by complexing the cellulose-fiber flat structure according to <10> and a matrix material.

<12> A method of producing a cellulose-fiber composite, the method including, in addition to obtaining a cellulose-fiber flat structure by performing filtering using the filter material defined in the method of producing a cellulose-fiber flat structure according to any one <1> to <9>, complexing the cellulose-fiber flat structure and a matrix material.

<13> A filter material having a water permeability of not more than 100 ml/m²·s and an initial tensile modulus of 20 MPa or greater, which is used for filtering a fine cellulose-fiber dispersion containing fine cellulose fibers having an average fiber diameter of 4 to 100 nm.

<14> A method of filtering a cellulose-fiber dispersion, the method including obtaining a cellulose-fiber flat structure by filtering a fine cellulose-fiber dispersion containing fine cellulose fibers having an average fiber diameter of 4 to 100 nm, using a filter material having a water permeability of not more than 100 ml/m²·s and an initial tensile modulus of 20 MPa or greater.

<15> The method of producing a cellulose-fiber flat structure according to any one of <1> to <5>, <8>, <9> and <12>, wherein the method includes, prior to obtaining the cellulose-fiber flat structure by performing filtering using the filter material, performing a fibrillation treatment on a raw material dispersion containing a dispersed cellulose, thereby obtaining the fine cellulose-fiber dispersion, and wherein the filter material is obtained by subjecting a fabric formed using a fiber having an average thread thickness of 1 to 5 d/f to a heat and pressure treatment, the thickness of the fabric is 100 μm or greater, and the fiber is a splittable composite fiber.

<16> The method of producing a cellulose-fiber flat structure according to any one of <1>, <6> and <7>, wherein the method includes, prior to obtaining the cellulose-fiber flat structure by performing filtering using the filter material, performing a fibrillation treatment on a raw material dispersion containing a dispersed cellulose, thereby obtaining the fine cellulose-fiber dispersion, and wherein the filter material is formed from a paper base material, and the paper base material has a thickness of 90 μm or greater.

Effects of the Invention

The present invention is able to provide a method of producing a cellulose-fiber flat structure, which can efficiently recover fine cellulose fibers from a dispersion containing fine cellulose fibers having a nano level average fiber diameter, can produce a cellulose-fiber flat structure having a favorable surface texture, and can be applied to continuous processes and the like, as well as providing a cellulose-fiber flat structure obtained using the above method, a cellulose-fiber composite obtained using the cellulose-fiber flat structure, and a method of producing the cellulose-fiber composite.

BEST MODE FOR CARRYING OUT THE INVENTION

Figure 1:
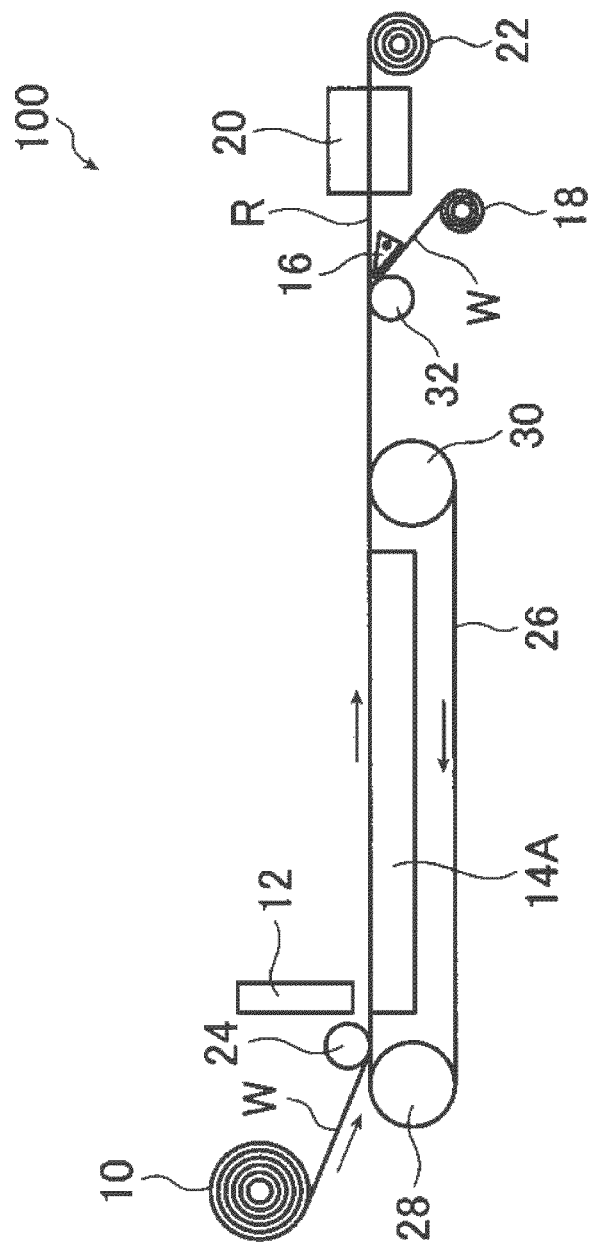
FIG. 1 is a schematic illustration of a first embodiment of a cellulose-fiber flat structure production apparatus used in the production of a cellulose-fiber flat structure.

Embodiments of the method of producing a cellulose-fiber flat structure according to the present invention are described below in detail. The production method includes the filtering step described below.

(Filtering Step)

A step of obtaining a cellulose-fiber flat structure by filtering a fine cellulose-fiber dispersion containing fine cellulose fibers having an average fiber diameter of 4 to 100 nm, using a filter material having a water permeability of not more than 100 ml/m²·s and an initial tensile modulus of 20 MPa or greater.

The materials and the procedure used in the above step, and other optional steps that may be performed, are described below.

First, the fine cellulose-fiber dispersion and the filter material that are used are described in detail.

<Fine Cellulose-Fiber Dispersion>

The fine cellulose-fiber dispersion is a dispersion containing fine cellulose fibers having an average fiber diameter of 4 to 100 nm.

In the present invention, the expression "fine cellulose fibers" describes fibers composed mainly of cellulose, and preferably fibers that use plant-derived cellulose as a raw material, which have been microfibrillated to produce fine cellulose fibers having the prescribed average fiber diameter. By subjecting this fine cellulose-fiber dispersion to filtering (papermaking), a flat structure can be obtained.

(Cellulose Type I Crystals)

The fine cellulose fibers are preferably fibers having a cellulose type I crystal structure.

The cellulose type I crystal structure is described on pages 81 to 86, or pages 93 to 99 of the first printing of the new edition of "Encyclopedia of Cellulose" published by Asakura Publishing Co., Ltd. Almost all natural cellulose has the cellulose type I crystal structure. In contrast, cellulose fibers that do not have the cellulose type I crystal structure, such as cellulose fibers having cellulose type II, type III or type IV structures, are derived from cellulose having the cellulose type I crystal structure.

Cellulose fibers can be identified as having the Type I crystal structure by the presence of characteristic peaks at two positions in the diffraction profile obtained by subjecting the fibers to a wide-angle X-ray diffraction measurement, namely in the vicinity of $2\theta=14$ to $17°$ and in the vicinity of $2\theta=22$ to $23°$.

(Repeating Units)

The fine cellulose fibers are preferably composed of a cellulose containing a repeating structural unit represented by a formula (I) shown below and/or a derivative thereof. Among the various possibilities, repeating units represented by the formula (I) preferably represent at least 50 mol % of all the repeating units within the cellulose (100 mol %), and a cellulose composed solely of repeating units represented by the formula (I) and/or a derivative thereof is particularly desirable.

Provided the fine cellulose fibers contain this type of repeating unit, the crystallinity increases, and a cellulose-fiber composite having high heat resistance, a high elastic modulus, high strength and a low coefficient of linear expansion can be produced.

[Chemical Formula 1]

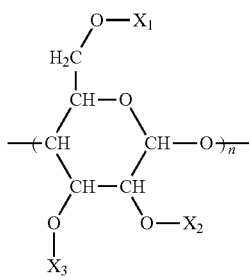

(1)

In the formula (1), each of $X_1$, $X_2$ and $X_3$ independently represents a hydrogen atom, an alkylcarbonyl group of 1 to 20 carbon atoms, an alkenylcarbonyl group of 2 to 6 carbon atoms which may be substituted with an allyl group, an alkynylcarbonyl group, an arylcarbonyl group, a nicotinoyl group, an isonicotinoyl group, or a furoyl group.

In the formula (1), each of $X_1$, $X_2$ and $X_3$ independently represents a hydrogen atom; an alkylcarbonyl group of 1 to 20 carbon atoms such as an acetyl group, propionyl group, butyryl group, 2-butyryl group, pentanoyl group, hexanoyl group, heptanoyl group, octanoyl group, nonanoyl group, decanoyl group, undecanoyl group, dodecanoyl group, myristoyl group, palmitoyl group, stearoyl group or pivaloyl group; an alkenylcarbonyl group of 2 to 6 carbon atoms which may be substituted with an allyl group, such as an acryloyl group, methacryloyl group or cinnamoyl group; an alkynylcarbonyl group such as a propioloyl group; an arylcarbonyl group such as a benzoyl group or naphthoyl group; or a nicotinoyl group, isonicotinoyl group, furoyl group or cinnamoyl group, but $X_1$, $X_2$ and $X_3$ are preferably hydrogen atoms. In such a case, the crystallinity improves, and the cellulose exhibits superior heat resistance, a high elastic modulus, high strength and a low coefficient of linear expansion.

In those cases where hydrophobicity is required, a portion of $X_1$, $X_2$ and $X_3$ may each represent an acetyl group, propionyl group, butyryl group, 2-butyryl group, pentanoyl group, hexanoyl group, heptanoyl group, octanoyl group, nonanoyl group, decanoyl group, undecanoyl group, dodecanoyl group, myristoyl group, palmitoyl group, stearoyl group, pivaloyl group, benzoyl group, naphthoyl group, nicotinoyl group, isonicotinoyl group, furoyl group or cinnamoyl group.

Further, in the cellulose-fiber composite described below, when complexing is performed with a (meth)acrylic resin, $X_1$, $X_2$ and $X_3$ are preferably each an acryloyl group, methacryloyl group and propioloyl group.

The chemical structure of the repeating unit within the cellulose can be confirmed by solid-state NMR.

(Average Fiber Diameter)

A feature of the fine cellulose-fiber dispersion of the present invention is the fact that the fiber diameter of the cellulose fibers contained in the dispersion is extremely narrow.

The average fiber diameter of the fine cellulose fibers within the fine cellulose-fiber dispersion is typically not more than 100 nm, and is preferably not more than 30 nm, and more preferably 20 nm or less. Although there are no particular limitations on the lower limit, the diameter is typically 4 nm or greater. Provided the diameter is not more than 100 nm, transparency can be maintained. Further, the limit for fiber diameters that can actually be produced is 4 nm or greater.

The fine cellulose fibers mentioned above include fibers having a fiber diameter of not more than 100 nm, and preferably include no fibers having a fiber diameter of 10 μm or greater, more preferably include no fibers having a fiber diameter of 1 μm or greater, and still more preferably include no fibers having a fiber diameter of 400 nm or greater. 400 nm is the shortest wavelength within visible light, and therefore if the cellulose fibers include fibers having a fiber diameter of 400 nm or greater, then light scattering is significant, and transparency may be lost when a composite is formed with a matrix material.

The average fiber diameter of the fine cellulose fibers can be confirmed by inspecting the cross-section of the fine cellulose-fiber dispersion or the cellulose-fiber composite described below using an SEM (scanning electron microscope).

(Fiber Length)

There are no particular limitations on the length of the fine cellulose fibers within the fine cellulose-fiber dispersion, but an average length of at least 100 nm is preferred. If the average length of the fibers is too short, then there is a risk that the strength of the cellulose-fiber composite described below will be unsatisfactory.

The fiber length of the fine cellulose fibers can be measured in the same manner as the fiber diameter of the fine cellulose fibers described above.

(Dispersion Medium)

Although there are no particular limitations on the dispersion medium for the fine cellulose-fiber dispersion of the present invention, water is typical, but an organic solvent or a mixed solvent of two or more organic solvents may also be used. Further, a mixed solvent of water and one or more organic solvents may also be used.

Examples of the organic solvent include alcohols such as methanol, ethanol, isopropyl alcohol, n-propyl alcohol and n-butanol, ketones such as acetone and methyl ethyl ketone, and other water-soluble organic solvents.

(Fine Cellulose-Fiber Concentration)

There are no particular limitations on the concentration of the fine cellulose fibers within the fine cellulose-fiber dispersion of the present invention, but relative to the total weight of the dispersion, the concentration is preferably at least 0.05% by weight, more preferably at least 0.07% by weight, and still more preferably 0.1% by weight or greater, but is preferably not more than 0.5% by weight, more preferably not more than 0.4% by weight, and still more preferably 0.3% by weight or less.

If the concentration of the fine cellulose fibers is too low, then because of the small amount of cellulose fibers within the dispersion, the production efficiency for the cellulose-fiber flat structure described below tends to deteriorate. If the concentration is too high, then the in-plane uniformity of the cellulose-fiber flat structure tends to deteriorate.

(Various Additives)

Furthermore, the fine cellulose-fiber dispersion may also contain one or more surfactants, paper strengthening agents, softening agents or sizing agents. Examples of additives that may be used include those disclosed in paragraph [0061] of Japanese Laid-Open Patent Application No. 2009-299043.

(Chemical Modification)

The cellulose fibers contained in the fine cellulose-fiber dispersion of the present invention may have been derivatized by chemical modification. Chemical modification describes a process in which the hydroxyl groups within the cellulose are reacted with a chemical modification agent to effect chemical modification.

Chemical modification may be performed on the cellulose-fiber flat structure described below. Further, chemical modification may also be performed on the cellulose raw material prior to fibrillation, or on the cellulose raw material obtained after performing a refining treatment to remove lignin and hemicellulose and the like, but from the viewpoint of enabling the chemical modification agent to react efficiently, chemical modification is preferably performed on the cellulose after the refining treatment.

<Method of Producing Fine Cellulose-Fiber Dispersion>

There are no particular limitations on the method used for producing the dispersion described above, and examples include methods in which the cellulose raw material is subjected to a chemical treatment or a mechanical fibrillation treatment. Among the various possibilities, a method that includes a step of obtaining the aforementioned fine cellulose-fiber dispersion by subjecting a raw material dispersion containing a dispersed cellulose to a fibrillation treatment (a dispersion production step) is preferred.

By performing a fibrillation treatment, the cellulose within the raw material dispersion can be satisfactorily reduced in size, enabling cellulose fibers of the prescribed size to be obtained, and enabling a composite material having the desired optical properties and mechanical properties to be obtained.

A description of the materials (such as the cellulose raw material) and the fibrillation treatment method used when performing fibrillation treatment of the raw material dispersion containing the dispersed cellulose is presented below.

(Cellulose Raw Material)

There are no particular limitations on the type of cellulose raw material used in the present invention, but a cellulose obtained from a plant-derived raw material is preferable.

Specific examples of the plant-derived raw material include wood materials such as softwood or hardwood, cotton such as cotton linter or cotton lint, kenaf or hemp, and ramie. Plant-derived raw materials are preferred from an economic viewpoint to non-plant-derived cellulose such as bacterial cellulose, as they offer excellent practical utility in terms of productivity and cost. Further, cellulose obtained from plant-derived raw materials have a high crystallinity, and therefore tend to have a low coefficient of linear expansion. Among plant-derived materials, cotton is preferred from the viewpoint that fibers having a fine fiber diameter can easily be obtained, but because the production volume of cotton is poor compared with wood materials, cotton is not desirable from an economic viewpoint. On the other hand, wood materials such as softwood or hardwood yield fine microfibrils of approximately 4 nm which have a linear fiber form that is free from branching, and therefore light scattering is unlikely. Moreover, wood is the living resource that is produced in the largest quantity on earth, and because it is a renewable resource produced in an amount of at least 70,000,000,000 tons per year, its contribution to the reduction of carbon dioxide which effects global warming is substantial, and it is therefore very desirable as a raw material, both from a performance and an economic standpoint.

The cellulose raw material used in the present invention is preferably this type of plant-derived raw material, and a plant-derived raw material having an average minimum length of at least 10 μm and an average maximum length of not more than 10 cm can be used particularly favorably.

Here, the "average minimum length" is the average value of the lengths of those portions having the shortest lengths (or diameters) among the raw material chips (these raw material chips may have various shapes such as fiber shapes or particle-like shapes), and the "average maximum length" is the average value of the lengths of those portions having the longest lengths (or diameters) among the raw material chips. These lengths can be measured in the manner described below.

(Method of Measuring Minimum Length and Maximum Length)

For chips having a size within a range from approximately 1 mm to 10 cm, the minimum length and maximum length can be measured using a ruler or calipers or the like. For chips having a size within a range from approximately 10 μm to 1 mm, measurement can be performed by observation of the chips under an optical microscope. The average value is the average of 10 randomly selected samples.

If the average minimum length of the raw material is too small, then the removal rate for the cleaning liquid during the cellulose refining step described below tends to slow, making the step inefficient, whereas if the average maximum length of the raw material is too large, then the handling deteriorates, and the efficiency of the refining process may deteriorate.

The average minimum length of the raw material is preferably at least 50 μm, and the average maximum length of the raw material is preferably not more than 5 cm, and in a particularly preferred raw material, the average minimum length of the raw material is from 50 to 100 μm, and the average maximum length of the raw material is from 100 to 500 μm.

Accordingly, in the present invention, the plant-derived raw material mentioned above may be cut or fractured as required to obtain chips of this appropriate size.

In those cases where a surface treatment such as the refining of the raw material described below is performed, the cutting or fracturing of the raw material may be performed at any time before the surface treatment, during the surface treatment, or after the surface treatment. For example, the cutting or fracturing can be conducted using an impact pulverizer or a shearing pulverizer if performed prior to the refining treatment, or using a refiner if performed during the refining treatment or after the refining treatment.

(Refining Treatment)

The plant-derived raw material described above is preferably subjected to a refining treatment in an aqueous dispersion medium to remove substances other than cellulose in the raw material such as lignin, hemicellulose and resins (gum).

Water is generally used as the aqueous dispersion medium used in the refining treatment, but an aqueous solution of an acid, a base or another treatment agent may also be used, and in such a case, a final washing treatment with water may be performed.

Further, during the refining treatment, the temperature may be adjusted or a pressure may be applied. Moreover, the raw material may be ruptured to form wood chips or wood powder or the like, and as mentioned above, this rupturing may be performed at any time before, during or after the refining treatment.

There are no particular limitations on the acid, base or other treatment agent used in the refining treatment of the raw material. Examples include sodium carbonate; sodium hydrogen carbonate; sodium hydroxide; potassium hydroxide; magnesium hydroxide; sodium sulfide; magnesium sulfide; sodium sulfite; calcium sulfite; magnesium sulfite; ammonium sulfite; sodium sulfate; sodium thiosulfate; sodium oxide; magnesium oxide; calcium oxide; acetic acid; oxalic acid; sodium hypochlorite; calcium hypochlorite; sodium chlorite; sodium chlorate; chlorine dioxide; chlorine; sodium perchlorate; sodium thiosulfate; hydrogen peroxide; ozone; hydrosulfite; anthraquinone; dihydrodihydroxyanthracene; tetrahydroanthraquinone; anthrahydroquinone; alcohols such as ethanol, methanol or 2-propanol; and water-soluble organic solvents such as acetone. These treatment agents may be used individually, or two or more may be used in combination.

Further, if required, a bleaching treatment may be performed using chlorine, ozone, sodium hypochlorite, hydrogen peroxide or chlorine dioxide or the like.

Furthermore, two or more treatment agents may be used to conduct two or more refining treatments, and in such a case, it is preferable that a cleaning treatment with water is performed between the refining treatments employing different treatment agents.

There are no particular limitations on the temperature and pressure during the above refining treatment. The temperature is typically selected from within a range from 0° C. to 100° C., but if the treatment is performed under a pressure exceeding 1 atmosphere, the temperature is preferably from 100° C. to 200° C. Further, the cellulose surface may be chemically modified by reacting the cellulose with a chemical modification agent such as an organic acid like acetic anhydride, and this chemical modification may be performed after the refining.

(Dispersion Medium)

The dispersion medium (solvent) for the raw material dispersion is typically water, but a single organic solvent or a mixed solvent of two or more organic solvents may also be used. Further, a mixed solvent of water and one or more organic solvents may also be used.

Examples of the organic solvent include alcohols such as methanol, ethanol, isopropyl alcohol, n-propyl alcohol and n-butanol, ketones such as acetone and methyl ethyl ketone, and other water-soluble organic solvents.

Although there are no particular limitations on the amount of cellulose within the raw material dispersion, in terms of the fibrillation treatment described below, the amount is preferably within a range from 0.2 to 10% by weight, and more preferably from 0.3 to 6% by weight, relative to the total weight of the raw material dispersion.

(Fibrillation Treatment)

There are no particular limitations on the method used for the fibrillation treatment of the raw material dispersion, provided that fine cellulose fibers having the desired average fiber diameter are obtained. For example, a method may be used in which ceramic beads having a diameter of approximately 1 mm are added to a fine cellulose-fiber dispersion having a cellulose concentration of 0.1 to 10% by weight, for example approximately 1% by weight, and a paint shaker or a beads mill or the like is used to oscillate the dispersion, thereby microfibrillating the cellulose.

Further, in another method, the fine cellulose-fiber dispersion is placed in a blender-type disperser, or a high-speed rotating homogenizer or the like in which a blade or screw is rotated at high speed and a shearing force is imparted as the dispersion is discharged from a slit (such as a Clearmix device manufactured by M Technique Co., Ltd.), and the blade or screw is then rotated at high speed to effect fibrillation of the cellulose.

Moreover, other methods may also be employed, including a method in which the fine cellulose-fiber dispersion is placed under a pressure of approximately 14 MPa, and the pressure is then rapidly reduced, generating a shearing force between the cellulose fibers that causes fibrillation (the high-pressure homogenizer method), and a method that employs a counter collision-type disperser such as a Masscomizer-X (manufactured by Masuko Sangyo Co., Ltd.).

Among the various methods, performing an ultrasonic treatment under specific conditions is preferred.

Moreover, in terms of markedly improving the efficiency of the fibrillation, it is particularly desirable to first perform a fibrillation by jetting the raw material dispersion from a high-pressure atmosphere and rapidly reducing the pressure (high-pressure homogenizer treatment), and then conduct an ultrasonic treatment. The reason for this improved efficiency is that the high-pressure homogenizer treatment microfibrillates the cellulose fibers down to a size of several μm or less, thereby improving the irradiation efficiency of the ultrasonic waves.

The aforementioned treatment method in which the raw material dispersion is jetted from a high-pressure atmosphere and reduced in pressure (high-pressure homogenizer treatment), and the ultrasonic treatment are described below in detail.

(High-Pressure Homogenizer Treatment)

As described above, in those cases where fibrillation is performed by jetting the raw material dispersion from a high-pressure atmosphere and reducing the pressure, a raw material dispersion having a cellulose concentration (solid fraction concentration) of at least 0.2% by weight but not more than 10% by weight, and preferably at least 0.3% by weight but not more than 6% by weight, is jetted from a high-pressure atmosphere. If the cellulose concentration within the raw material dispersion is too low, then the volume of liquid relative to the amount of cellulose being treated becomes too large, and the efficiency tends to deteriorate. Further, if the cellulose concentration is too high, then jetting of the dispersion from the fine pores may become difficult, and therefore the concentration is altered by adding an appropriate amount of water to the raw material dispersion supplied to the fibrillation treatment.

A high-pressure homogenizer is preferably used as the raw material dispersion jetting device. Specifically, the raw material dispersion is pressurized by a pressurization device, preferably to at least 30 MPa, more preferably to at least 100 MPa, still more preferably to at least 150 MPa, and most preferably to at least 220 MPa, and is then jetted from nozzles having a pore diameter of at least 50 μm, and subjected to a reduction in pressure equal to a pressure difference of at least 30 MPa, preferably at least 80 MPa, and more preferably at least 90 MPa. As a result of a cleaving phenomenon caused by this pressure difference, the cellulose is microfibrillated. If the pressure of the high-pressure conditions is low, or the pressure difference between the high-pressure and reduced-pressure conditions is small, then the fibrillation efficiency deteriorates, and the number of jetting repetitions required to achieve the desired fiber diameter increases significantly, which is undesirable. Further, if the pore diameter of the pores through which the raw material dispersion is jetted is too large, then a satisfactory fibrillation effect is unobtainable. In this case, even if the jetting treatment is repeated, there is a risk that cellulose fibers having the desired fiber diameter may not be obtainable.

The jetting of the raw material dispersion may be repeated two or more times if required to achieve cellulose fibers of the desired fiber diameter. This number of repetitions (number of passes) is typically at least one and preferably at least three, but is typically not more than 20 and preferably not more than 15. As the number of passes is increased, the degree of fibrillation can be increased, but if the number of passes is excessively high, the costs become undesirably high.

More specifically, the number of repetitions is typically from 1 to 20, and preferably from 3 to 15.

There are no particular limitations on the high-pressure homogenizer, but a Ultimizer manufactured by Gaulin Corporation or Sugino Machine Ltd. can be used as a specific device.

The higher the high-pressure conditions during jetting, the greater the cleaving phenomenon caused by the pressure difference, and the greater the degree of fibrillation that can be achieved, but the upper limit for the device specifications is typically not more than 245 MPa.

Similarly, a large pressure difference between the high-pressure and reduced-pressure conditions is preferred, but the upper limit for the pressure difference obtained by jetting from pressurized conditions generated by a pressurization device into atmospheric pressure is generally not more than 245 MPa.

Furthermore, provided the diameter of the pores through which the raw material dispersion is jetted is small, a high-pressure state can be created easily, but if the diameter is excessively small, then the jetting efficiency tends to deteriorate. This pore diameter is preferably at least 50 μm but not more than 800 μm, more preferably at least 100 μm but not more than 500 μm, and still more preferably at least 150 μm but not more than 350 μm.

Although there are no particular limitations on the temperature (temperature of the raw material dispersion) during jetting, the temperature is typically at least 5° C. but not more than 100° C. If the temperature is too high, then there is a risk of accelerating degradation of the equipment, and specifically the feed pump and the high-pressure seals and the like.

There may be either one or two jetting nozzles, and the jetted cellulose may be impacted against a wall, a ball or a ring provided in the jetting target area. In the case of two nozzles, the two jets of cellulose may be set so as to collide with each other in the jetting target area.

A fine cellulose-fiber dispersion of the present invention can be obtained by performing only this type of treatment using a high-pressure homogenizer, but in such cases, the number of repetitions required to achieve a satisfactory degree of fibrillation is large, meaning the treatment efficiency is poor, and therefore it is preferable that the fibrillation is conducted by performing 1 to 5 repetitions of the high-pressure homogenizer treatment, and subsequently conducting an ultrasonic treatment.

(Ultrasonic Treatment)

In the present invention, the cellulose concentration within the raw material dispersion irradiated with ultrasonic waves is preferably within a range from 0.01 to 10% by weight, more preferably from 0.1 to 5% by weight, and most preferably from 0.2 to 2% by weight, relative to the total weight of the raw material dispersion. If the cellulose concentration of the raw material dispersion irradiated with ultrasonic waves is too low, then the treatment is inefficient, whereas if the concentration is too high, the viscosity increases and the fibrillation treatment tends to lose uniformity. In the present invention, water and/or an organic solvent may be added, if required, to ensure that the cellulose concentration of the raw material dispersion supplied to the ultrasonic treatment satisfies the prescribed concentration range mentioned above.

Furthermore, from the viewpoint of the fibrillation efficiency, the fiber diameter of the cellulose within the raw material dispersion irradiated with ultrasonic waves is preferably not more than 10 μm, more preferably not more than 2 μm, and most preferably 1 μm or less. Although there are no particular limitations on the lower limit, the diameter is typically at least 4 nm.

The frequency of the ultrasonic waves irradiated into the cellulose dispersion is preferably within a range from 15 kHz to 1 MHz, more preferably from 20 kHz to 500 kHz, and most preferably from 20 kHz to 100 kHz. If the frequency of the irradiated ultrasonic waves is too small, then the cavitation described below is less likely to occur. If the frequency is too large, then the generated cavitation tends to disappear before growing large enough to cause the desired physical effects, meaning a fibrillation effect is not obtained.

Further, the output of the ultrasonic waves, reported as an effective output density, is preferably at least 1 $W/cm^2$, more preferably at least 10 $W/cm^2$, and most preferably 20 $W/cm^2$ or greater. If the output of the ultrasonic waves is too small, then the fibrillation efficiency deteriorates, meaning irradiation for a long period of time is required to achieve satisfactory fibrillation, which is impractical. In terms of the durability of the vibrator or horn, the upper limit for the effective output density of the ultrasonic waves is typically not more than 500 $W/cm^2$.

The effective output density of the ultrasonic waves can be calculated from the temperature increase observed for 500 ml of water. Specifically, 500 ml of water is placed in a container, the water is irradiated with ultrasonic waves, the amount of temperature increase is measured, and the effective output density is calculated in accordance with an equation (2) shown below.

$$P=(T/s)\times 4.18\times 500/A \tag{2}$$

Here, P represents the effective output density of the ultrasonic waves ($W/cm^2$), T represents the temperature increase (° C.), s represents the time (seconds), and A represents the surface area of the ultrasonic vibrator ($cm^2$), which in the case of a horn-type device, corresponds with the surface area of the end surface, and in the case of a bath-type device, corresponds with the surface area of the surface to which the vibrator is attached.

When measuring the temperature, it is necessary to thoroughly insulate the container holding the water, so that the heat generated by the energy of the irradiated ultrasonic waves is not transmitted externally. Further, at temperatures higher than room temperature, the heat is transmitted externally more readily, and therefore the temperature at a point where the temperature has increased by not more than 10° C. from room temperature, and the time taken for that temperature increase, are typically used to perform the calculation using the above equation (2).

There are no particular limitations on the ultrasonic irradiation method, and various methods may be employed.

Examples of methods that may be used include a method in which the cellulose is microfibrillated directly by inserting a horn that can transmit the vibrations of the ultrasonic vibrator directly into the aforementioned raw material dispersion, a method in which the cellulose is microfibrillated by installing an ultrasonic vibrator at the bottom of, or in a portion of the wall of, the container containing the raw material dispersion, and a method in which fibrillation is performed by placing a liquid such as water in a vessel having an ultrasonic vibrator mounted therein, and then immersing a container containing the raw material dispersion within the vessel, so that the ultrasonic vibration is applied to the raw material dispersion indirectly via the liquid such as water.

Among these methods, the method in which the horn is inserted directly into the raw material dispersion is able to directly transmit the ultrasonic energy, enabling the energy density to be increased, and therefore this method is efficient and can be favorably employed.

The fibrillation treatment may be performed using a batch treatment method in which a predetermined amount of the raw material dispersion is irradiated with ultrasonic waves of the prescribed frequency, at the prescribed effective output density and for a predetermined period of time, and then the entire amount of the dispersion is replaced. Alternatively, treatment may also be performed using a method in which ultrasonic waves are irradiated continuously while a constant volume of the raw material dispersion is circulated through a treatment container having an ultrasonic vibrator installed near a horn, or within the bottom or wall of the container. Moreover, two or more ultrasonic vibrators may be installed within a single treatment container, or two or more treatment containers each having a single ultrasonic vibrator installed therein may be connected together.

Particularly in those cases where the raw material dispersion is circulated continuously during the treatment, a method in which a plurality of treatment containers containing a vibrator are connected in series, and the raw material dispersion flows sequentially through the containers is preferred in terms of efficiency. In such cases, the two or more vibrators may have the same frequency, or the frequencies may be varied.

Further, the ultrasonic waves may be irradiated continuously, or may be irradiated intermittently with a prescribed interval between irradiations. For example, a method may be used in which ultrasonic irradiation for 0.1 to 0.9 seconds and an operational pause of 0.1 to 0.9 seconds are repeated in an alternating manner.

When an ultrasonic treatment is performed, the applied energy is converted to heat, and the temperature of the raw material dispersion increases. Accordingly, in order to enable the fibrillation treatment to be performed under constant treatment conditions, cooling or heating or the like is preferably used to maintain the temperature of the raw material dispersion at a constant value. The temperature of the raw material dispersion during the ultrasonic treatment is preferably within a range from 1 to 80° C., more preferably from 10 to 60° C., and still more preferably from 15 to 40° C. If this temperature is too low, then freezing may occur when water is used as the dispersion medium, making treatment impossible. In other words, generating cavitation in solid ice is problematic, and in the case of a mixture of water and ice, cavitation occurs at the ice surface, resulting in consumption of the energy and a deterioration in the efficiency of the cellulose fibrillation. In contrast, if the treatment temperature is too high, vapor such as fine steam tends to form on the surface of the ultrasonic vibrator, resulting in an undesirable reduction in the energy efficiency.

The ultrasonic irradiation treatment time may be any time that enables the cellulose fibers in the dispersion to undergo the desired degree of fibrillation, and may be set appropriately in accordance with factors such as the output and frequency of the ultrasonic waves used, and the fiber diameter of the cellulose fibers prior to ultrasonic irradiation.

The principles relating to fibrillation of cellulose fibers by ultrasonic treatment are not completely understood, but it is surmised that the phenomena described below occur.

Namely, when ultrasonic irradiation is performed with the cellulose fibers suspended or dispersed within a liquid such as water, the ultrasonic waves generated from the ultrasonic vibrator contact the cellulose fibers, generating cavitation at the interface between the cellulose fibers and water. The thus generated cavities rapidly shrink and disappear, but at this time, a large shearing force is generated in the vicinity of the cavity. As a result of this shearing force, fine cellulose fibers are peeled from the surface of the cellulose fibers, thus forming fine cellulose fibers.

The fiber diameter of the cellulose within the raw material dispersion prior to the ultrasonic treatment can be confirmed using an optical microscope. Further, the fiber diameter of the fine nano-size cellulose fibers generated by the ultrasonic treatment or the like can be determined by removing the dispersion medium from the dispersion by drying, and then observing and measuring the fibers using an SEM or TEM.

Following the fibrillation treatment (for example, the ultrasonic treatment) described above, a centrifugal separation treatment or the like may be performed if required.

In the present invention, it is particularly desirable that a fibrillation treatment is conducted prior to performing filtering using the filter material to obtain the cellulose-fiber flat structure.

<Filter Material>

Next is a detailed description of the filter material that is used.

The filter material used in the present invention has a water permeability of not more than 100 $ml/m^2 \cdot s$ and an initial tensile modulus of 20 MPa or greater. By using such a filter material, the type of fine cellulose fibers described above can be efficiently recovered from the dispersion, and a cellulose-fiber flat structure having a favorable surface texture can be obtained.

(Water Permeability)

The water permeability of the filter material is not more than 100 ml/m²·s. Provided the water permeability of the filter material satisfies the above range, cellulose fibers having the prescribed average fiber diameter can be recovered with good efficiency, and a cellulose-fiber flat structure having superior surface texture can be obtained. Of the various possibilities, in terms of the residual film ratio, the water permeability is preferably not more than 70 ml/m²·s, more preferably not more than 50 ml/m²·s, still more preferably not more than 30 ml/m²·s, and most preferably 20 ml/m²·s or less. The lower limit is typically at least 5 ml/m²·s, and preferably 10 ml/m²·s or greater.

More specifically, the water permeability of the filter material is within a range from 5 to 100 ml/m²·s, preferably from 5 to 70 ml/m²·s, more preferably from 5 to 50 ml/m²·s, still more preferably from 10 to 30 ml/m²·s, and most preferably from 10 to 20 ml/m²·s.

If the water permeability exceeds 100 ml/m²·s, then the amount of cellulose fibers contained in the filtrate increases, meaning the recovery efficiency worsens, and the surface texture of the obtained cellulose-fiber flat structure also tends to deteriorate. Further, if the water permeability is too small, then it becomes more difficult for the dispersion medium to pass through the filter, and a problem arises in that the filtration is not completed. The method used for measuring the water permeability is described below in detail within the examples section.

(Initial Tensile Modulus)

From the viewpoints of ensuring minimal deformation of the filter material, and suppressing transfer of the texture of the mesh or the like used as the support for the filter material to the surface of the cellulose-fiber flat structure, the initial tensile modulus of the filter material is at least 20 MPa. The initial tensile modulus is preferably at least 30 MPa, and more preferably at least 50 MPa, but is preferably not more than 500 MPa.

More specifically, the initial tensile modulus of the filter material is typically within a range from 20 to 500 MPa, preferably from 30 to 500 MPa, and more preferably from 50 to 500 MPa.

Provided the initial tensile modulus is at least 20 MPa, transfer from the support material is suppressed, and the surface texture of the cellulose-fiber flat structure is good. Provided the initial tensile modulus is not more than 500 MPa, the filter material can be flattened by applying tension to the filter material, which is desirable. If the initial tensile modulus is too high, then the filter material may not be able to be flattened even when tension is applied.

However, in the case of a filter material made of paper, because the elongation of the material is very small, an initial tensile modulus of not more than 4,000 MPa is preferred.

More specifically, in those cases where a paper base material is used as the filter material, the initial tensile modulus is typically within a range from 1,000 to 6,000 MPa, preferably from 1,500 to 5,000 MPa, and more preferably from 2,000 to 4,000 MPa.

(Thickness)

Typically, the thickness of the filter material is preferably at least 90 μm. Provided the thickness of the filter material satisfies this range, filtering can be performed efficiently and wrinkling and plastic deformation of the filter material can be suppressed, and as a result, a cellulose-fiber flat structure having minimal surface asperity can be obtained. The thickness of the filter material is preferably at least 100 μm, but is preferably not more than 3 mm, and more preferably 1 mm or less.

More specifically, the thickness of the filter material is typically within a range from 100 μm to 3 mm, preferably from 100 μm to 1 mm, more preferably from 120 μm to 300 μm, and most preferably from 150 μm to 200 μm.

If the thickness is too great, then the rolling diameter and the weight become too large when the filter material is produced as an elongated material, and the load on the apparatus increases, meaning that if economic limitations are also considered, it becomes difficult to produce the filter material in a continuous production process.

(Shape)

The most appropriate shape for the filter material may be selected in accordance with the intended use, and possible shapes include elongated shapes, circular shapes and elliptical shapes. In terms of applying the filter material to the continuous production process for a cellulose-fiber flat structure described below, an elongated shape is preferable. When the filter material is an elongated shape, the width of the filter material is preferably at least 30 cm, more preferably at least 1 m, and most preferably 5 m or greater. Further, the width is preferably not more than 10 m, more preferably not more than 8 m, and most preferably 6 m or less.

The length of the filter material is preferably at least 50 m, more preferably at least 100 m, and most preferably 1,000 m or greater. Further, the length of the filter material is preferably not more than 20,000 m, more preferably not more than 15,000 m, and still more preferably 10,000 m or less.

(Material)

There are no particular limitations on the material that constitutes the filter material, provided it satisfies the properties described above, and examples include resins, fibers, metals and ceramics, although a filter material formed from fibers is preferred. Examples of the fibers include natural fibers such as cotton, hemp and silk; regenerated fibers such as rayon, polynosic, cupra, acetate, triacetate and promix; polyamide-based fibers typified by nylon 6 and nylon 66; and synthetic fibers (synthetic resin fibers) such as polyester, acrylic, polyvinyl chloride, vinylon, polypropylene, polyurethane, vinylidene and polyvinylidene fluoride. Among these, in terms of achieving a combination of favorable passage of the dispersion medium and good releasability of the cellulose-fiber flat structure, a synthetic fiber is preferred.

Further, a paper base material formed from the natural fiber cellulose can be used as the filter material. A paper base material can be used to easily produce a wide and elongated material, and the water permeability of the paper can be controlled by altering the variety of pulp used as the raw material and the degree of beating of the pulp, and therefore a paper base material is extremely desirable. Further, water resistance can also easily be imparted to the base material by using a water resistant agent or a hydrophobic agent. Furthermore, the tensile modulus can also be controlled by altering the variety of pulp and the degree of beating.

When the filter material is formed from the type of fiber described above, the filter material may be a fibrous sheet (fibrous cloth) in the form of a nonwoven fabric, knitted fabric, plain weave fabric, double weave fabric, twill fabric or satin weave fabric or the like, but in terms of obtaining a filter material with a high degree of surface flatness and suppressing transfer of the surface texture of the filter material, in terms of achieving a high recovery rate for the fine cellulose fibers, and in terms of enabling the production of a wide and elongated material (for example, 1 m wide and 100 m long) at a reasonable cost, a knitted fabric or a plain weave fabric is preferred, and a knitted fabric is particularly desirable.
(Porosity)

There are no particular limitations on the porosity of the filter material, provided the filter material satisfies the above ranges for the water permeability and the initial tensile modulus, but the porosity is preferably not more than 60%, and more preferably not more than 40%. The lower limit is preferably at least 10%.

If the porosity is too large, then the recovery rate of the fine cellulose fibers deteriorates, whereas if the porosity is too small, the filtration rate slows and the productivity deteriorates. The porosity can be measured by the nitrogen adsorption method, or by using a transmission electron microscope (TEM) or scanning electron microscope (SEM) or the like.

Preferred Embodiment of the Filter Material

One example of a preferred embodiment of the filter material is a filter material obtained by subjecting a fabric (cloth) formed using fibers having an average thread thickness of 1 to 5 d/f to a heat and pressure treatment. By performing the heat and pressure treatment, the gaps between the fibers are filled and a flatter surface is formed, thereby enabling suppression of transfer of the surface texture of the support material that supports the filter material, as well as an increase in the recovery rate of the fine cellulose fibers, and a shortening of the filtration time.

First, the fabric (fibrous cloth) is described, and then the conditions of the heat and pressure treatment are described in detail.
<Fabric>
(d(denier)/f(filaments))

As the fibers that form the fabric, fibers having an average thread thickness of 1 to 5 d/f are preferably used. By using fibers that satisfy this range, filtration of the fine cellulose fibers can be used to obtain a filter material having a favorable porous state. The average thread thickness is preferably at least 1.2 d/f, more preferably at least 1.5 d/f, and still more preferably 1.6 d/f or greater. Further, the average thread thickness is preferably not more than 4.5 d/f, and more preferably not more than 2.0 d/f.

More specifically, the average thread thickness is preferably within a range from 1.2 to 4.5 d/f, more preferably from 1.5 to 4.5 d/f, and most preferably from 1.6 to 2.0 d/f.

The d (denier) in "d (denier)/f (filaments)" is the mass of 9,000 m of the thread represented in units of grams. In the case of a fine denier thread, the threads are bundled together and used as a single thread, and the number of threads within the bundle is represented by f (filaments). The value of d/f is the value obtained by dividing the mass of 9,000 m by the number of threads within the bundle.
(Material)

Examples of the fibers used for forming the fabric include the natural fibers, regenerated fibers and synthetic fibers listed above, and among these, synthetic fibers are preferred. Among the synthetic fibers, polyester, polyamide-based fibers such as nylon 6 and nylon 66; polypropylene; and polyurethane and the like are particularly preferred. Blended fibers containing two or more of the above fibers (such as synthetic fibers) may also be used as the fibers.

Furthermore, the fibers used are preferably splittable composite fibers. Splittable composite fibers are composed of fibers of different types, and have a cross-sectional structure in which each of the components are arranged in an alternate manner, so that when pressure is applied or the fibers are placed in a solvent, the fibers split into two or more parts. Examples of the cross-sectional structure include radial-shaped, multilayered and cross-shaped structures. By using these splittable fibers, and performing a heat and pressure treatment or a solvent treatment or the like, the pores within the filter material can be better filled, and as a result, the recovery rate of the fine cellulose fibers can be improved.

Although there are no particular limitations on the material of the splittable composite fibers, from the viewpoints of ease of availability and recovery efficiency of the fine cellulose fibers, splittable composite fibers composed of the synthetic fibers described above are preferred. Combinations of synthetic fibers selected from among polyester and polyamide-based fibers are particularly preferred. There are no particular limitations on the weight fraction of each of the types of fiber within the splittable composite fibers. In those cases where two types of fiber are used, the content of one of the fibers is preferably within a range from 5 to 95% by weight, and more preferably from 60 to 70% by weight. The content of the other fiber is preferably within a range from 5 to 95% by weight, and more preferably from 30 to 40% by weight.

The number of splits within the splittable composite fiber is arbitrary, but the use of a splittable composite fiber having at least 4 splits, preferably at least 8 splits, and most preferably 12 to 32 splits, is desirable.
(Weave)

There are no particular limitations on the weaving of the fibers that form the fabric, and examples include the aforementioned nonwoven fabric, knitted fabric, plain weave fabric, double weave fabric, twill fabric or satin weave fabric. Among these, for the reasons outlined above, a knitted fabric or plain weave fabric is preferred, and a knitted fabric is particularly desirable.
(Fabric Weight)

Although there are no particular limitations on the fabric weight of the fabric subjected to the heat and pressure treatment, from the viewpoint of achieving a high recovery rate for the fine cellulose fibers, the weight is preferably at least 50 g/m$^2$, and more preferably at least 100 g/m$^2$, but is preferably not more than 3,000 g/m$^2$, and more preferably 1,000 g/m$^2$ or less.

More specifically, the fabric weight of the fabric subjected to the heat and pressure treatment is preferably within a range from 50 to 3,000 g/m$^2$, and more preferably from 100 to 1,000 g/m$^2$.
<Paper Base Material>

Examples of the paper base material include high-quality paper, medium-quality paper, photocopy paper, art paper, coated paper, finely coated paper and kraft paper. Examples of the raw material for the paper base material include chemical pulps and mechanical pulps. Examples of chemical pulps include kraft pulp (KP, in which the cooking liquor contains NaOH and Na$_2$S), polysulfide pulp (SP, in which the cooking liquor contains NaOH and Na$_2$S$_x$, wherein X=2 to 5), soda pulp (in which the cooking liquor contains NaOH), sulfite pulp (in which the cooking liquor contains Na$_2$SO$_3$), sodium carbonate pulp (in which the cooking liquor contains Na$_2$CO$_3$), and oxygen soda pulp (in which the cooking liquor contains O$_2$ and NaOH). Among these, kraft pulp is preferred in terms of flatness and cost. Further, either an unbleached pulp or a bleached pulp may be used as the pulp.

The raw material pulp may be an unbeaten pulp or a beaten pulp, but a beaten pulp is preferred as it yields improved flatness of the paper base material. The pulp beating degree is preferably within a range from 40 to 450 ml (the Canada standard freeness prescribed in MS P8121, this also applies below), more preferably from 60 to 400 ml, and still more preferably from 80 to 380 ml. If the pulp beating degree exceeds 450 ml, then the flatness of the paper base material tends to deteriorate. If the pulp beating degree is less than 40 ml, then the water permeability of the base material increases, and the dewatering rate of the fine cellulose-fiber dispersion decreases undesirably.

In order to increase the strength of the paper base material, appropriate amounts of additives including paper strengthening agents such as starch or polyacrylamide, rosin-based sizing agents, alkenyl ketene dimer-based sizing agents, ASA-based sizing agents, sulfuric acid band and wax emulsions are preferably added to the raw material pulp.

The basis weight of the paper base material is preferably within a range from 30 to 300 $g/m^2$, more preferably from 45 to 250 $g/m^2$, and most preferably from 60 to 200 $g/m^2$. If the weight is less than 30 $g/m^2$, then the water permeability increases undesirably. If the weight exceeds 300 $g/m^2$, then handling of an elongated material becomes difficult, which is also undesirable.

The thickness of the paper base material is preferably within a range from 50 μm to 350 μm, more preferably from 70 μm to 300 μm, and most preferably from 90 μm to 250 μm. Provided the thickness is at least 50 μm, the water permeability increases, and provided the thickness is not more than 350 μm, handling of elongated materials is improved, both of which are desirable.

The density of the paper (the value obtained by dividing the basis weight by the thickness) is preferably within a range from 0.5 $g/cm^3$ to 1.3 $g/cm^3$, and more preferably from 0.6 to 1.2 $g/cm^3$. If the density is less than 0.5 $g/cm^3$, then the water permeability increases, whereas if the density exceeds 1.3 $g/cm^3$, the dewatering rate decreases, both of which are undesirable.

(Thickness, Shape)

Although there are no particular limitations on the thickness of the fabric that is subjected to the heat and pressure treatment, the thickness is preferably at least 100 μm, and more preferably at least 200 μm, but is preferably not more than 5 mm, and more preferably 3 mm or less.

More specifically, the thickness of the fabric subjected to the heat and pressure treatment is preferably within a range from 100 μm to 5 mm, and more preferably from 200 μm to 3 mm.

By performing compression from a thickness within the above range to the prescribed thickness (a thickness that is preferably at least 90 μm), internal pores can be reduced in size, resulting in a better improvement in the recovery rate for the fine cellulose fibers.

There are no particular limitations on the shape of the fabric, and the most appropriate shape may be selected in accordance with the intended use. Possible shapes include elongated shapes, circular shapes and elliptical shapes.

<Heat and Pressure Treatment>

Examples of the treatment used for heating and compressing the above fabric include a calender treatment and a hot press treatment and the like. Of these, from the viewpoint of productivity, a calender treatment is preferred.

A calender treatment is a treatment in which the fabric is treated under high temperature and high pressure using, for example, a metal roller and an elastic roller (such as a roller formed of resin), and the texture of the fabric surface that contacts the metal roller can be flattened particularly favorably.

The surface temperature of the metal roller can be selected appropriately in accordance with the type of synthetic fiber selected. For example, in the case of a blended fiber of polyester and nylon, the temperature of the metal roller is preferably at least 100° C., and more preferably 150° C. or higher.

The upper limit for the temperature is approximately 250° C. The nip pressure during the calender treatment is preferably at least 100 kg/cm, and more preferably within a range from 200 to 1,000 kg/cm.

<Filtering Method>

There are no particular limitations on the method used for filtering the aforementioned fine cellulose-fiber dispersion using the filter material, and the method may be selected appropriately from among reduced-pressure filtering methods, normal pressure filtering methods, and pressurized filtering methods.

In the case of reduced-pressure filtering, although there are no particular limitations on the reduced-pressure conditions, a pressure within a range from −0.010 to −0.099 MPa is preferred, and a pressure of −0.040 to −0.095 MPa is more preferable.

Further, in the case of pressurized filtering, although there are no particular limitations on the pressurization conditions, a pressure within a range from 0.01 to 5 MPa is preferred, and a pressure of 0.1 to 1 MPa is more preferable.

Conventional devices can be used as the filtering device. Examples include a filter press, drum filter, or pump-pressurized line filter or the like.

The filtering system is not particularly limited, and either batch filtering or continuous filtering may be performed.

From the viewpoint of industrial productivity, the cellulose-fiber flat structure is preferably produced continuously. In other words, a process that performs filtering continuously (a continuous filtration system) is preferred.

An apparatus for producing the cellulose-fiber flat structure in a continuous manner is described below in detail.

A cellulose-fiber flat structure production apparatus 100 illustrated in FIG. 1 includes a filter material supply unit 10 that supplies a filter material W, a dispersion supply unit 12 that supplies the fine cellulose-fiber dispersion to the surface of the filter material W, a vacuum chamber unit 14A that uses a reduced-pressure treatment to remove the solvent from the fine cellulose-fiber dispersion supplied to the surface of the filter material W, thus producing a cellulose-fiber flat structure R on top of the filter material W, a peeling unit 16 that peels the formed cellulose-fiber flat structure R from the surface of the filter material W, a filter material recovery unit 18 that recovers the filter material W that has been peeled by the peeling unit 16, a drying unit 20 that dries the cellulose-fiber flat structure R that has been peeled by the peeling unit 16, and a structure collection unit 22 that collects the cellulose-fiber flat structure R that has been dried by the drying unit 20. Guide rollers are installed between each of the units, and the filter material W supplied from the filter material supply unit 10 is transported through each of the units while being guided by these guide rollers, so that treatment is performed continuously during transport through each of the units.

The aforementioned filter material W is wound in a roll-like form on the filter material supply unit (filter supply roll) 10, and is supplied continuously from the supply unit 10.

The supplied filter material W is positioned by a guide roller 24 on top of an endless wire mesh 26 which travels around transport rollers 28 and 30. By rotating these transport rollers 28 and 30 using a drive device not shown in the drawing, the wire mesh 26 is rotated in the direction of the arrows. The dispersion supply unit 12 that supplies the fine cellulose-fiber dispersion is provided above the wire mesh 26, and the vacuum chamber unit 14A is provided on the opposite side of the wire mesh 26 from the dispersion supply unit 12.

The dispersion supply unit 12 in FIG. 1 may be composed of a single unit or two or more units.

The fine cellulose-fiber dispersion supplied from the dispersion supply unit 12 is supplied to the top of the filter material W, and forms a liquid film. By using the vacuum chamber unit 14A disposed on the opposite side of the filter material W from the surface on which the liquid film is formed to place the unit under reduced-pressure conditions, the solvent contained within the liquid film passes through the filter material W, and is collected and removed, thereby forming the cellulose-fiber flat structure R on the surface of the filter material W.

The vacuum chamber unit 14A may be any device capable of generating a reduced-pressure state or vacuum state, and conventional devices can be employed.

The cellulose-fiber flat structure R formed on top of the filter material W passes across a guide roller 32, and is then separated by the peeling unit 16 into the filter material W and the cellulose-fiber flat structure R. The filter material recovery unit (filter material winding roller) 18 is positioned downstream from the peeling unit 16, and the separated filter material W is wound into a roll-like form for recovery.

Further, the cellulose-fiber flat structure R that is peeled away by the peeling unit 16 is transported to the drying unit 20 to remove any solvent incorporated within the structure. The drying unit 20 may employ any conventional drying method, provided it is capable of removing the solvent. Examples of the drying method employed include hot air circulation methods, vacuum methods, far infrared methods, and heated roller contact methods and the like.

Figure 5A:
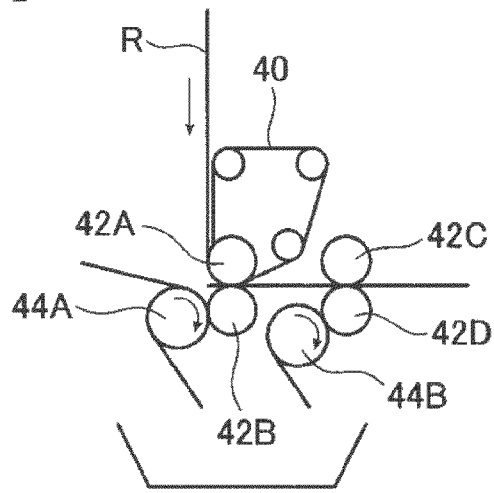
FIG. 5A is a first schematic illustration of a drying device used for drying a cellulose-fiber flat structure.
Figure 5B:
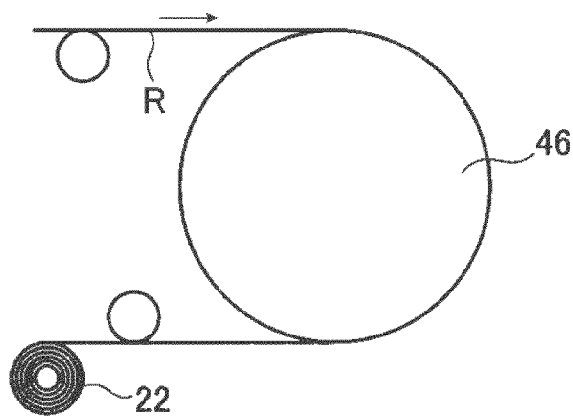
FIG. 5B is a second schematic illustration of a drying device used for drying a cellulose-fiber flat structure.
Figure 5C:
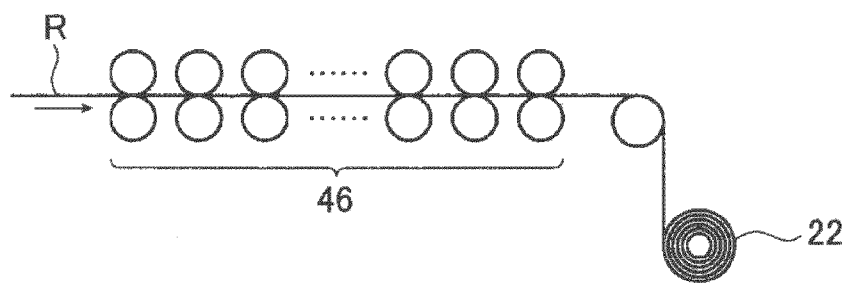
FIG. 5C is a third schematic illustration of a drying device used for drying a cellulose-fiber flat structure.

Among these, the methods illustrated in FIG. 5A to FIG. 5C are preferred.

As illustrated in FIG. 5A, the cellulose-fiber flat structure R may be dried by pressing the cellulose-fiber flat structure R against a PET mesh woven fabric 40, applying pressure at room temperature using PTFE rollers 42A, 42B, 42C and 42D, and removing the solvent adhered to these rollers using absorbent sponge rollers 44A and 44B.

Further, as illustrated in FIG. 5B, the cellulose-fiber flat structure R may be dried by winding around a heated roller 46. Furthermore, although not shown in FIG. 5B, when the cellulose-fiber flat structure R is dried by winding around the heated roller 46, a cloth-like member may be pressed against the cellulose-fiber flat structure R from the opposite side to the heated roller.

Moreover, as illustrated in FIG. 5C, the cellulose-fiber flat structure R may be dried by passing the structure through two or more pairs of heated rollers 46 while pressure is applied by the rollers.

The cellulose-fiber flat structure R that has been dried by the drying unit 20 is collected by winding into a roll-like form at the structure collection unit (structure winding roller) 22 positioned downstream from the drying unit 20.

Figure 2:
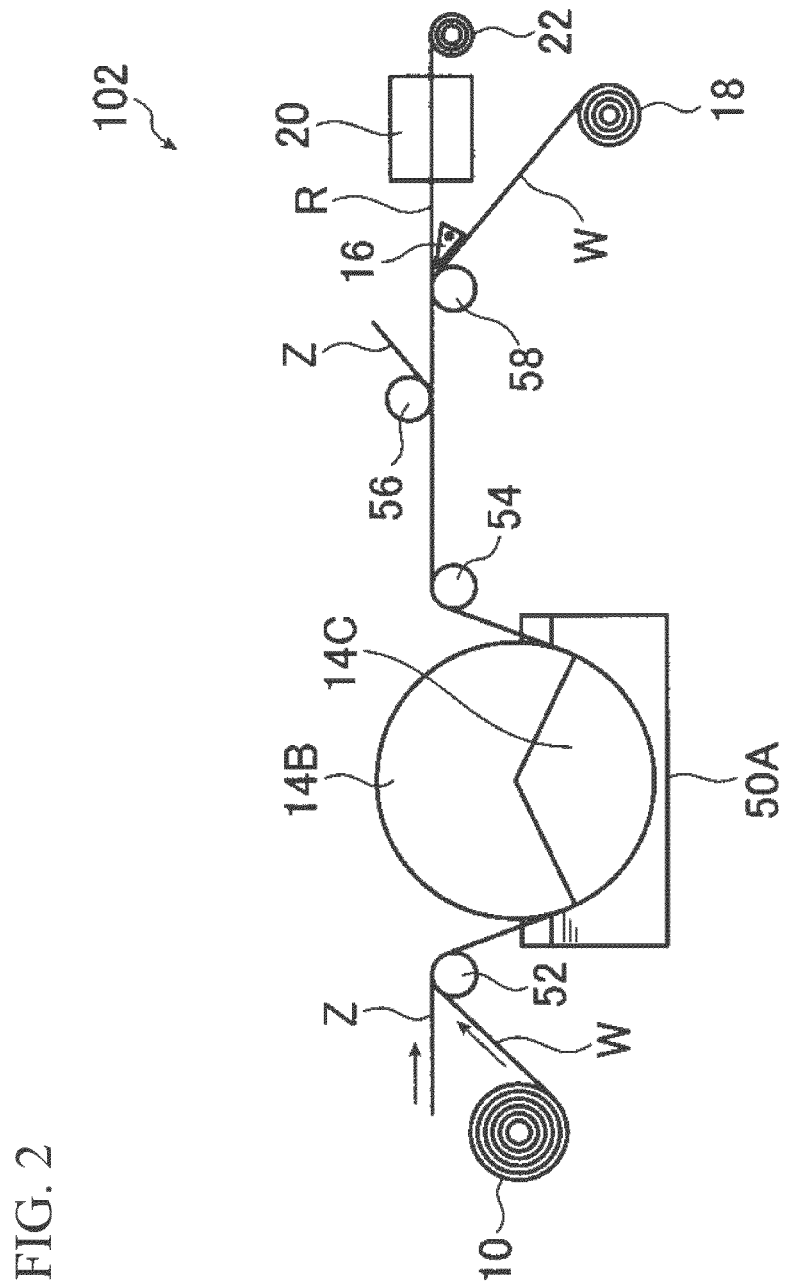
FIG. 2 is a schematic illustration of a second embodiment of a cellulose-fiber flat structure production apparatus used in the production of a cellulose-fiber flat structure.

A cellulose-fiber flat structure production apparatus 102 illustrated in FIG. 2 includes the filter material supply unit 10 that supplies the filter material W, a drum-like vacuum chamber unit 14B around which the supplied filter material W is wound, a dispersion tank 50A, in which the fine cellulose-fiber dispersion is stored, and in which the filter material W wound around the drum-like vacuum chamber unit 14B is immersed, thereby forming the cellulose-fiber flat structure R on the surface of the filter material W, the peeling unit 16 that peels the formed cellulose-fiber flat structure R from the surface of the filter material W, the filter material recovery unit 18 that recovers the filter material W that has been peeled by the peeling unit 16, the drying unit 20 that dries the cellulose-fiber flat structure R that has been peeled by the peeling unit 16, and the structure collection unit 22 that collects the cellulose-fiber flat structure R that has been dried by the drying unit 20.

The filter material W supplied from the filter material supply unit 10 is guided by a guide roller 52 so as to make contact with a filter fabric Z. There are no particular limitations on the variety of this filter fabric Z, provided it has a prescribed mechanical strength. A supply unit for the filter fabric Z is not shown in the drawing, but the filter fabric Z is transported in the direction of the arrow.

The filter material W is wound onto the surface of the drum-like vacuum chamber unit 14B positioned downstream from the guide roller 52, and is then immersed in the dispersion tank 50A containing the fine cellulose-fiber dispersion. At this time, a reduced-pressure state or vacuum state is generated in a vacuum unit 14C of the vacuum chamber unit 14B, causing filtration to proceed at the surface of the filter material W contacting the dispersion, thereby forming a cellulose-fiber flat structure R on the surface of the filter material W.

The filter material W is transported out from the dispersion tank 50A via guide rollers 54, 56 and 58. First, the filter fabric Z is wound, and then the peeling unit 16 performs a separation into the filter material W and the cellulose-fiber flat structure R. The filter material recovery unit 18 is positioned downstream from the peeling unit 16, and the separated filter material W is wound into a roll-like form for recovery.

Further, the cellulose-fiber flat structure R that is peeled away by the peeling unit 16 is transported to the drying unit 20 to remove any solvent incorporated within the structure. The cellulose-fiber flat structure R that has been dried by the drying unit 20 is collected by winding into a roll-like form at the structure collection unit 22 positioned downstream from the drying unit 20.

Figure 3:
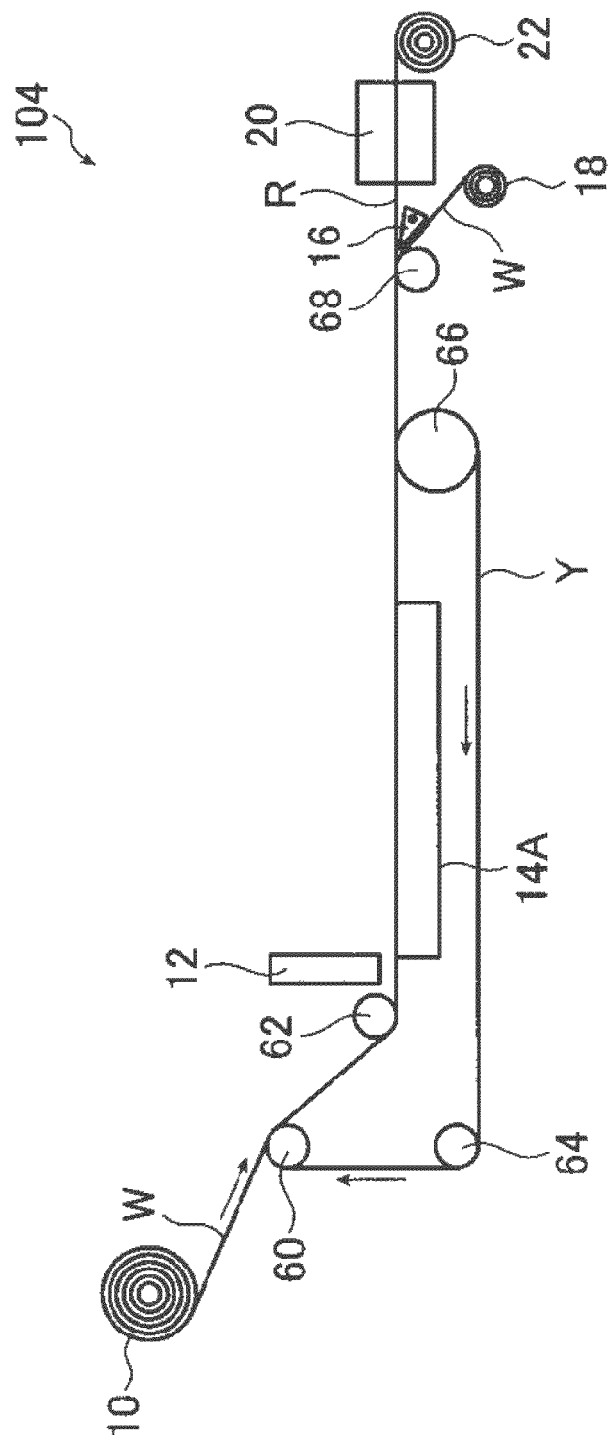
FIG. 3 is a schematic illustration of a third embodiment of a cellulose-fiber flat structure production apparatus used in the production of a cellulose-fiber flat structure.

A cellulose-fiber flat structure production apparatus 104 illustrated in FIG. 3 includes the filter material supply unit 10 that supplies the filter material W, the dispersion supply unit 12 that supplies the fine cellulose-fiber dispersion to the surface of the filter material W, the vacuum chamber unit 14A that uses a reduced-pressure treatment to remove the solvent from the fine cellulose-fiber dispersion supplied to the surface of the filter material W, thus producing a cellulose-fiber flat structure R on top of the filter material W, the peeling unit 16 that peels the formed cellulose-fiber flat structure R from the surface of the filter material W, the filter material recovery unit 18 that recovers the filter material W that has been peeled by the peeling unit 16, the drying unit 20 that dries the cellulose-fiber flat structure R that has been peeled by the peeling unit 16, and the structure collection unit 22 that collects the cellulose-fiber flat structure R that has been dried by the drying unit 20. The dispersion supply unit 12 in FIG. 3 may be composed of a single unit or two or more units.

The filter material W supplied from the filter material supply unit 10 is guided by a transport roller 60 and a guide roller 62 so as to make contact on top of a filter fabric Y. There are no particular limitations on the variety of this filter fabric Y, provided it has a prescribed mechanical strength. The filter fabric Y is in the form of an endless belt which passes around transport rollers 60, 64 and 66. By rotating these transport rollers 60, 64 and 66 using a drive device not shown in the drawing, the filter fabric Y is also rotated.

The fine cellulose-fiber dispersion supplied from the dispersion supply unit 12 is supplied to the top of the filter material W, and forms a liquid film. Subsequently, by using the vacuum chamber unit 14A disposed on the opposite side of the filter material W from the surface on which the liquid film is formed to place the unit under reduced-pressure conditions, the solvent contained within the liquid film passes through the filter material W, and is collected and removed, thereby forming the cellulose-fiber flat structure R on the surface of the filter material W.

The cellulose-fiber flat structure R formed on top of the filter material W passes across a guide roller 68, and is then separated by the peeling unit 16 into the filter material W and the cellulose-fiber flat structure R. The filter material recovery unit 18 is positioned downstream from the peeling unit 16, and the separated filter material W is wound into a roll-like form for recovery.

Further, the cellulose-fiber flat structure R that is peeled away by the peeling unit 16 is transported to the drying unit 20 to remove any solvent incorporated within the structure. The cellulose-fiber flat structure R that has been dried by the drying unit 20 is collected by winding into a roll-like form at the structure collection unit 22 positioned downstream from the drying unit 20.

Figure 4:
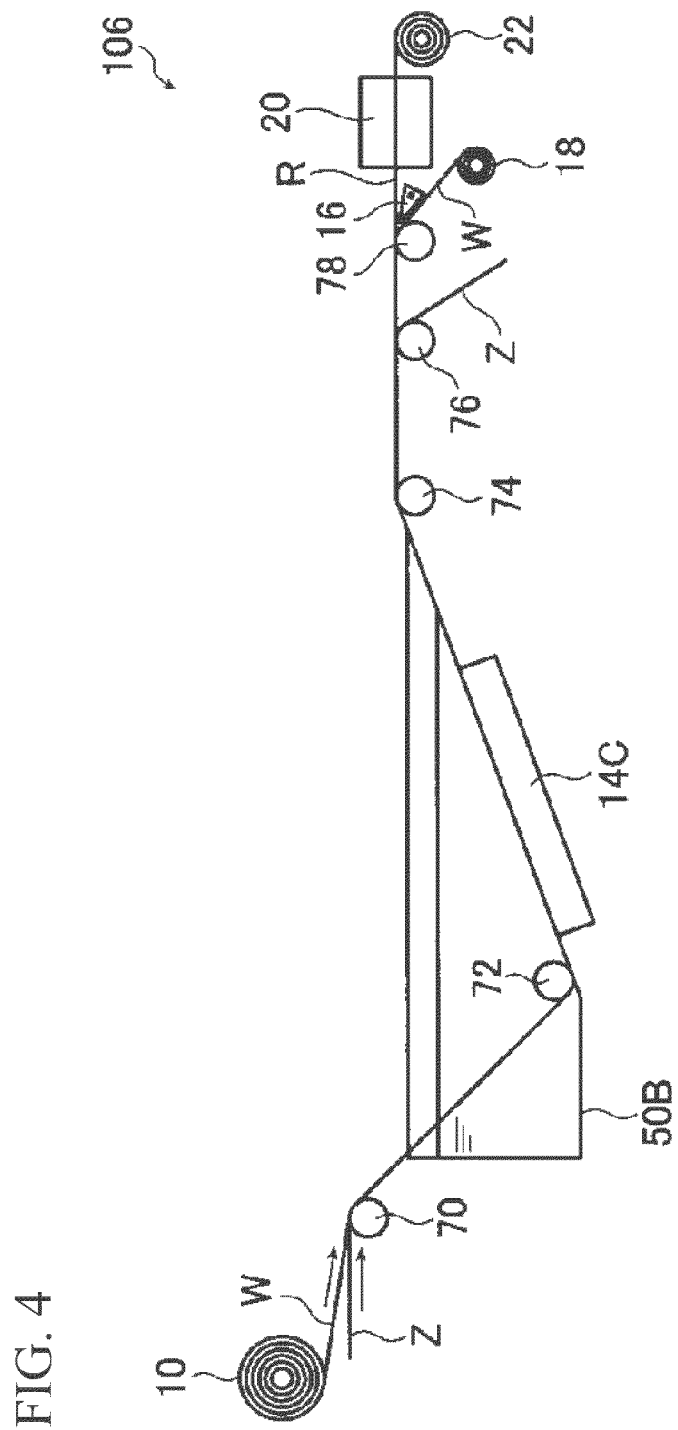
FIG. 4 is a schematic illustration of a fourth embodiment of a cellulose-fiber flat structure production apparatus used in the production of a cellulose-fiber flat structure.

A cellulose-fiber flat structure production apparatus 106 illustrated in FIG. 4 includes the filter material supply unit 10 that supplies the filter material W, a dispersion tank 50B, in which the fine cellulose-fiber dispersion is stored and in which the filter material W is immersed, a vacuum chamber unit 14C, which is positioned beneath the dispersion tank 50B and uses a reduced-pressure treatment to remove the solvent from the fine cellulose-fiber dispersion contacting the surface of the filter material W, thus producing a cellulose-fiber flat structure R on the filter material W, the peeling unit 16 that peels the formed cellulose-fiber flat structure R from the surface of the filter material W, the filter material recovery unit 18 that recovers the filter material W that has been peeled by the peeling unit 16, the drying unit 20 that dries the cellulose-fiber flat structure R that has been peeled by the peeling unit 16, and the structure collection unit 22 that collects the cellulose-fiber flat structure R that has been dried by the drying unit 20.

The filter material W supplied from the filter material supply unit 10 is guided by a guide roller 70 so as to make contact with a filter fabric Z. A supply unit for the filter fabric Z is not shown in the drawing, but the filter fabric Z is transported in the direction of the arrow.

The filter material W is transported into the dispersion tank 50B containing the fine cellulose-fiber dispersion, and makes contact with the dispersion. A reduced-pressure state or vacuum state is generated in the vacuum chamber unit 14C positioned at the bottom of the dispersion tank 50B with the filter material W disposed therebetween, so that a cellulose-fiber flat structure R is formed on the surface of the filter material W as the filter material W moves across the top of the vacuum chamber unit 14C.

The filter material W is transported out from the dispersion tank 50B via guide rollers 74, 76 and 78. First, the filter fabric Z is wound, and then the peeling unit 16 performs a separation into the filter material W and the cellulose-fiber flat structure R. The filter material recovery unit 18 is positioned downstream from the peeling unit 16, and the separated filter material W is wound into a roll-like form for recovery.

Further, the cellulose-fiber flat structure R that is peeled away by the peeling unit 16 is transported to the drying unit 20 to remove any solvent incorporated within the structure. The cellulose-fiber flat structure R that has been dried by the drying unit 20 is collected by winding into a roll-like form at the structure collection unit 22 positioned downstream from the drying unit 20.

In the aforementioned cellulose-fiber flat structure production apparatuses 100, 102, 104 and 106, the filter material is disposed on a wire mesh or a filter fabric or the like, but if the filter material has sufficient mechanical strength, this mesh or fabric may be unnecessary.

Furthermore, two or more of the aforementioned cellulose-fiber flat structure production apparatuses 100, 102, 104 and 106 may be provided, and the two or more cellulose-fiber flat structures R may be bonded and laminated together, either before or after treatment in the respective drying units 20. Generally, from the viewpoint of filtering efficiency, a method in which the thickness of the structure is achieved by forming a laminate rather than a single layer offers improved productivity.

<Cellulose-Fiber Flat Structure>

The cellulose-fiber flat structure obtained using the filtering method described above is a structure (film or sheet) composed of the fine cellulose fibers described above.

(Drying Treatment)

The cellulose-fiber flat structure obtained using the method described above may be subjected to a drying treatment if necessary. The drying may be performed by circulated air drying, drying under reduced pressure, or drying under pressure. Heated drying may also be performed. In those cases where heating is performed, the temperature is preferably at least 50° C., and more preferably at least 80° C., but is preferably not more than 250° C., and more preferably 150° C. or less.

More specifically, the heating temperature is typically within a range from 50 to 250° C., preferably from 80 to 200° C., and more preferably from 100 to 150° C.

If the heating temperature is too low, then the drying requires considerable time, and the degree of drying may be inadequate, whereas if the heating temperature is too high, the cellulose-fiber flat structure may discolor, or the cellulose may start to decompose.

Furthermore, in the case of drying under pressure, the pressure is preferably at least 0.01 MPa, and more preferably at least 0.1 MPa, but is preferably not more than 5 MPa, and more preferably 2 MPa or less.

If the pressure is too low, then the degree of drying may be inadequate, whereas if the pressure is too high, then the cellulose-fiber flat structure may become crushed or the cellulose may start to decompose.

(Large-Diameter Fiber Content)

When the cellulose-fiber flat structure of the present invention is impregnated with an oil having a refractive index of 1.52 and then observed using a microscope, the volume fraction of fibers having a fiber diameter of 400 nm or greater (hereafter this fraction is referred to as the "large-diameter fiber content") is preferably not more than 5%. Specifically, this large-diameter fiber content can be measured using the method described below in the examples section.

If this large-diameter fiber content is too large, then a significant amount of cellulose fibers having a diameter larger than the wavelength of visible light will exist, and therefore the transparency of the fibers themselves will deteriorate, and a polymer cellulose composite having high transparency will be unobtainable. The lower this large-diameter fiber content is the better, and it is more preferably not more than 1%, and even more preferably 0.1% or less.

<Cellulose-Fiber Composite>

The cellulose-fiber composite is a composite obtained by complexing the cellulose-fiber flat structure described above with a matrix material. The matrix material is a material that is used to fill the pores within the cellulose-fiber flat structure, and is preferably a polymer material.

Among such polymer materials, one or more polymer materials or precursors thereto (such as monomers) selected from among thermoplastic resins which become fluid liquids upon heating, thermosetting resins which undergo polymerization upon heating, and light-curable (active energy beam-curable) resins that undergoes polymerization and curing upon irradiation with an active energy beam such as ultraviolet light or an electron beam is preferred. In the present invention, a precursor to a polymer material refers to a monomer or an oligomer.

Examples of these types of matrix materials include the materials disclosed in paragraphs [0117] to [0182] of WO 2009/081881.

Further, the method disclosed in paragraphs [0183] to [0194] of WO 2009/081881 can be used as the method of producing the cellulose-fiber composite. In other words, the method includes a step of complexing the cellulose-fiber flat structure described above and the matrix material.

<Uses>

The cellulose-fiber composite described above can be produced as a composite having high transparency, high strength, low water absorption and low haze, and because the composite exhibits excellent optical properties, it is ideal as a display, substrate or panel for liquid crystal displays, plasma displays, organic EL displays, field emission displays and rear-projection televisions and the like. Further, the composite is also suitable as a substrate for solar cells such as silicon-based solar cells and dye-sensitized solar cells. When used as a substrate, the composite may be laminated to a barrier film, ITO film and TFT or the like. Furthermore, the composite can also be used favorably as a window material for automobiles, a window material for railway vehicles, a window material for houses, or a window material for offices and factories and the like. In the case of a window material, a film such as a fluorine coating film or a hard coat film, or an impact-resistant or light-resistant material may be laminated to the window material as required.

Furthermore, by utilizing the properties of the composite including a low coefficient of linear expansion, high elasticity and excellent strength, the composite can also be used as a structural material in applications other than the above transparent material applications. In particular, the composite can be used favorably for materials used in automobiles such as glazing, interior materials, external plates and bumpers, as well as for casings for personal computers, household electronic components, packaging materials, building materials, construction materials, fishery materials and other industrial materials.

EXAMPLES

The present invention is described below in further detail based on a series of production examples, examples and comparative examples, but the following examples in no way limit the scope of the present invention,

[Evaluation Methods]

The physical properties and the like of the samples prepared in the production examples, the examples and the comparative example were evaluated using the methods described below.

<Cellulose Fiber Content within Fine Cellulose-Fiber Dispersion>

Measurement of the cellulose fiber content (% by weight) within the fine cellulose-fiber dispersion was calculated by determining the dispersion medium content (% by weight) in accordance with Japan TAPPI No. 56 "Test method for moisture in pulp material analysis samples", and then subtracting this dispersion medium content from 100% by weight to calculate the cellulose fiber content.

In other words, if the weight of the fine cellulose-fiber dispersion prior to drying was S1 (g), and the weight after drying at 105±2° C. for 2 hours and then cooling to room temperature in a desiccator was L1 (g), then the dispersion medium content M (% by weight) and the cellulose content C1 (% by weight) were determined from the following equations.

$$M=\{(S1-L1)/S1\}\times 100\quad C1=100-M$$

<Average Fiber Diameter of Cellulose Fibers in Fine Cellulose-Fiber Dispersion>

The average fiber diameter of cellulose fibers in the fine cellulose-fiber dispersion was determined by drying and removing the solvent medium from the dispersion, and then measuring the fiber diameter by observation using an SEM or TEM. The average of the diameter values measured at 10 randomly selected points was recorded as the average fiber diameter.

<Confirmation of Large-Diameter Fibers>

In order to ensure the absence of large-diameter fibers having a diameter of 400 nm or greater, observation was conducted using the oil impregnation method.

In this observation by the oil impregnation method, the cellulose-fiber flat structure prepared using the method described below was first cut to an appropriate size, and was then impregnated with an impregnation oil (Immersion Oil Type B (refractive index: 1.52), manufactured by Cargille Laboratories) on a slide glass, and covered with a cover glass. Following standing for at least 12 hours in this state, the sample was observed using a polarizing microscope (optical microscope, manufactured by Nikon Corporation). During the observation using the polarizing microscope, a visual field representing the sample shape was selected and the sample was subsequently observed under the cross-Nicol condition, and by combining photographs acquired at 4-fold magnification while the sample was rotated through 15-degree intervals, a fiber shape image that was independent of the in-plane orientation angle was obtained. Based on the obtained photographs, confirmation was made as to whether or not the sample included large-diameter fibers having a diameter of 400 nm or greater.

<Filter Material Thickness>

Using a film thickness meter (IP65, manufactured by Mitutoyo Corporation), the thickness of the filter material used was measured at 3 to 10 random locations, and the average value was recorded as the filter material thickness.

<Water Permeability of Filter Material>

The filter material was cut to a φ60 mm circular shape, and mounted in a φ60 mm Kiriyama funnel. The Kiriyama funnel was set in a reduced-pressure filtration bell jar, the filter material was wet with approximately 10 ml of demineralized water, and reduced-pressure filtration was performed until the demineralized water was no longer visible on the filter material. The inside of the filtration bell jar was returned to normal pressure, 30 ml of demineralized water was then poured onto the filter material, and the time taken for 10 ml of the demineralized water to pass through the filter material (permeation time) at normal pressure was measured using a stopwatch (room temperature water, no pressure difference). The water permeability was calculated using the equation shown below. This measurement was repeated 5 times, and the average value was recorded as the water permeability [ml/$m^2 \cdot s$] of the filter material. The demineralized water mentioned above was poured onto the surface of the filter material that had been treated by the metal roller in the calender treatment described below.

$$\text{Water permeability [ml/m}^2\cdot\text{s]} = \frac{10\text{ [ml]}}{30\text{ [mm]}\times 30\text{ [mm]}\times 3.14\times 10^{-6}\times \text{permeation time [seconds]}}$$

[Numerical equation 1]

In the case of the polytetrafluoroethylene filter material used in comparative example 1 described below, the filter material was first wet with approximately 10 ml of ethanol, and following performing reduced-pressure filtration until the ethanol was no longer visible on the filter material, the filtration bell jar was returned to normal pressure, and subsequent measurements and calculations were performed using the method described above.

<Initial Tensile Modulus of Filter Material>

Using a tensile tester STA-1225 and an extensometer U-4301B manufactured by Orientec Co., Ltd., the initial tensile modulus was measured in accordance with JIS K7127. The initial tensile modulus was calculated from the strain-stress curve obtained by measuring a type 2 test piece (b=20 mm, L0=50 mm, L=100 mm, 13=150 mm) at a tension rate of 5 mm/minute. At this time, the winding direction of the filter material was set as the lengthwise direction of the test piece. The tensile modulus is calculated as Et=(σ2−σ1)/(ε2−ε1), wherein Et represents the tensile modulus [MPa], σ1 and σ2 represent the measured tensile stress values [MPa], and ε1 and ε2 represent the amounts of strain. ε1 and ε2 were set arbitrarily so as to enable the initial slope to be determined from the graph.

<Residual Film Ratio>

The weight A [g] of the cellulose-fiber flat structure prepared using each filter material and the method of production example 1 described below was divided by the weight R1 [g] of the cellulose-fiber flat structure prepared using the filter material of the comparative example 1 (T100A090C) and the method of production example 2 described below, and the result was multiplied by 100 to determine the residual film ratio [% by weight].

Residual film ratio=$A \div R1 \times 100$

<Support Transferability>

Each of the filter materials described below was placed on a support composed of a fluororesin PFA net having a thread diameter of 250 μm and 25-mesh (distance between threads: 1 mm), and a cellulose-fiber flat structure was obtained using the method of the production example 1 or the production example 2. Using a digital microscope VHX-200 and a profile measurement system VHS-S15 manufactured by Keyence Corporation, the texture of the cellulose-fiber flat structure on the side of the filter material was observed, and the asperity and the pitch between peaks was measured.

In those cases where the texture of the fluororesin PFA net support such as the pitch of approximately 1 mm had been transferred to the surface of the cellulose-fiber flat structure, the support transferability was recorded as "B", whereas if no transfer was observed, an "A" was recorded.

<Production of Fine Cellulose-Fiber Dispersion>

Oregon pine wood powder (manufactured by Miyashita Co., Ltd., particle diameter: 50 to 250 μm (average particle diameter: 138 μm)) was prepared as a raw material. Next, a cellulose refining treatment was performed using the steps described below.

A sodium carbonate aqueous solution prepared with a concentration of 2% by weight was added to the wood powder, and the mixture was heated at a liquid temperature of 78 to 82° C. for 6 hours under continuous stirring. Following this treatment, the mixture was filtered, and the remaining wood powder was washed with demineralized water and filtered again. Subsequently, an aqueous solution containing 0.27% by weight of acetic acid and 1.33% by weight of sodium chlorite was added to the remaining wood powder, and the mixture was heated at a liquid temperature of 78 to 82° C. for 5 hours. Following this treatment, the mixture was filtered, and the remaining wood powder was washed with demineralized water and filtered again. Next, an aqueous solution containing 5% by weight of sodium hydroxide was added to the remaining wood powder, and the mixture was left to stand for 16 hours at a temperature within a range from room temperature to 30° C. Finally, the remaining wood powder was washed with demineralized water and filtered to obtain the cellulose.

During this refining treatment, the cellulose was maintained in a state wetted by water (with a water content of at least 50% by weight) without ever completely drying out, even during the filtering operations.

Demineralized water was added to the thus obtained cellulose, and 3 kg of a cellulose-fiber dispersion was prepared with the cellulose fiber content adjusted to 0.5% by weight.

Subsequently, the cellulose-fiber dispersion was transferred into a tank, and a circulation treatment was performed for 6 hours in which a pump was used to introduce the dispersion into the vessel of a rotational homogenizer at a flow rate of 10 l/minute (Clearmix CLM-2.2S (rotor: R1/screen: S1.0-24/350 ml continuous batch attachment), manufactured by M Technique Co., Ltd.) that was rotated by a rotor at 20,000 rpm, and the dispersion was then passed through the rotor and the screen and returned to the tank. At this time, the pressure inside the vessel was set to 0.2 MPa. Further, the vessel and the tank were cooled with cooling water in a 5° C. jacket to maintain the treatment temperature at 25° C. The above treatment was performed twice, yielding a total of 6 kg of a Clearmix-treated cellulose-fiber dispersion.

Next, 6 kg of the Clearmix-treated cellulose-fiber dispersion was subjected to a single pass treatment using an ultra high pressure homogenizer (Ultimizer HJP-25005 (single nozzle type, pore diameter: 150 μm) manufactured by Sugino Machine Ltd.) at a jet pressure of 245 MPa, thus obtaining 6 kg of an Ultimizer-treated cellulose-fiber dispersion.

The 6 kg of the Ultimizer-treated cellulose-fiber dispersion was transferred to a tank, a pump was used to introduce the dispersion into the lower portion of the flow vessel of an ultrasonic treatment apparatus (UIP2000, manufactured by Hielscher GmbH) at a rate of 4 l/minute, and an ultrasonic treatment was performed at an output of 2,000 W and a frequency of 20 kHz. During this treatment, the dispersion being treated was cooled with cooling water in a 5° C. jacket, and the dispersion temperature was 15° C. The ultrasonically treated liquid was then returned to the tank, and the treatment was continued while the dispersion was circulated through the treatment apparatus for 2 hours and 30 minutes, yielding 5.5 kg of an ultrasonically treated cellulose-fiber dispersion.

Finally, 5.5 kg of the ultrasonically treated cellulose-fiber dispersion was passed into a centrifugal separator (CR22, manufactured by Hitachi Koki Co., Ltd.) fitted with a continuous centrifugal separation unit R18C at a rate of 100 ml/minute while the empty rotor was rotated at 3,000 rpm. Once the inside of the rotor had filled with the ultrasonically treated cellulose-fiber dispersion, the rotational rate was increased to 18,000 rpm. 10 minutes after the rotational rate had reached 18,000 rpm, the supernatant was extracted, yielding 5 kg of a fine cellulose-fiber dispersion containing 0.31% by weight of fine cellulose fibers.

The average fiber diameter of the fine cellulose fibers within this fine cellulose-fiber dispersion, measured by the type of TEM observation described above, was 16 nm. Further, inspection of the fibers using the oil impregnation method described above revealed absolutely no large-diameter fibers having a diameter of 400 nm or greater. A wide-angle X-ray diffraction image confirmed that the fine cellulose fibers in the dispersion had the cellulose type I crystal structure.

Production Example 1

Cellulose-Fiber Flat Structure Production 1

The filter material described below was fitted in a filter holder for reduced-pressure filtration (KG-90 (diameter: φ90 mm), manufactured by Advantec MFS, Inc.). Subsequently, the fine cellulose-fiber dispersion produced above was diluted with demineralized water to prepare 150 g of a dispersion having a cellulose fiber concentration of 0.13% by weight, and filtering was then started under reduced-pressure conditions (−0.09 MPa). Immediately after starting filtering, 30 ml of 2-propanol was added, and filtering was continued. Following the completion of the filtering operation, the deposit of fine cellulose fibers remaining on top of the filter material was peeled away from the filter material and press-dried for 5 minutes at a temperature of 120° C. and a pressure of 2 MPa, thus obtaining a cellulose-fiber flat structure.

Production Example 2

Cellulose-Fiber Flat Structure Production 2

The filter material described below was fitted in a filter holder for reduced-pressure filtration (KG-90 (diameter: φ90 mm), manufactured by Advantec MFS, Inc.). Subsequently, the filter material was wetted with approximately 10 ml of 2-propanol, reduced-pressure filtering was performed until the 2-propanol was no longer visible on the filter material, and the inside of the filtration bell jar was then returned to normal pressure. Subsequently, the fine cellulose-fiber dispersion produced above was diluted with demineralized water to prepare 150 g of a dispersion having a cellulose fiber concentration of 0.13% by weight, and filtering was then started under reduced-pressure conditions (−0.09 MPa). Immediately after starting filtering, 30 ml of 2-propanol was added, and filtering was continued. Following the completion of the filtering operation, the deposit of fine cellulose fibers remaining on top of the filter material was peeled away from the filter material and press-dried for 5 minutes at a temperature of 120° C. and a pressure of 2 MPa, thus obtaining a cellulose-fiber flat structure.

Example 1

A knitted fabric (average thread thickness: 2.0 d/f (50d/25f), composition: 70% by weight polyester/30% by weight nylon (splittable composite fiber), thickness: 370 µm, fabric weight: 180 g/m$^2$) was subjected to a calender treatment to produce a filter material (5025SDY). The thickness of the thus obtained filter material (5025SDY) was 180 µm, and the water permeability was 17.0 ml/m$^2$·s.

Using the thus obtained filter material, a cellulose-fiber flat structure was produced in accordance with the method described above in the production example 1. The initial tensile modulus of the filter material was 220 MPa. Further, in terms of the surface texture of the cellulose-fiber flat structure, only surface texture derived from the knitted fabric was confirmed (asperity: 45 µm, pitch: 168 µm), and no surface texture derived from the net or the like was confirmed, indicating no transfer of the support texture. The results are shown in Table 1. The dispersion was poured onto the surface of the filter material obtained by the calender treatment that had been treated by the metal roller.

Example 2

A knitted fabric (average thread thickness: 1.6 d/f (50d/32f), composition: 60% by weight polyester/40% by weight nylon (splittable composite fiber), thickness: 390 µm, fabric weight: 160 g/m$^2$) was subjected to a calender treatment to produce a filter material (535CL). The thickness of the thus obtained filter material (535CL) was 165 µm, and the water permeability was 29.0 ml/m$^2$·s.

Using the thus obtained filter material, a cellulose-fiber flat structure was produced in accordance with the method described above in the production example 1. The initial tensile modulus of the filter material was 260 MPa. The results are shown in Table 1. The dispersion was poured onto the surface of the filter material obtained by the calender treatment that had been treated by the metal roller.

Example 3

A knitted fabric (average thread thickness: 1.6 d/f (50d/32f), composition: 60% by weight polyester/40% by weight nylon (splittable composite fiber), thickness: 360 µm, fabric weight: 155 g/m$^2$) was subjected to a calender treatment to produce a filter material (500ASCL). The thickness of the thus obtained filter material (500ASCL) was 172 µm, and the water permeability was 49.0 ml/m$^2$·s.

Using the thus obtained filter material, a cellulose-fiber flat structure was produced in accordance with the method described above in the production example 1. The initial tensile modulus of the filter material was 100 MPa. The results are shown in Table 1. The dispersion was poured onto the surface of the filter material obtained by the calender treatment that had been treated by the metal roller.

Example 4

Using a high-quality paper (basis weight: 70 g/m$^2$, thickness: 100 µm, LBKP, fiber diameter: 18 µm, manufactured by Oji Paper Co., Ltd.) as the filter material, a cellulose-fiber flat structure was produced in accordance with the method described above in the production example 1. The water permeability of the filter material was 25 ml/m$^2$·s, the initial tensile modulus was 3,500 MPa, and the residual film ratio was 95%.

Example 5

Using a high-quality paper (basis weight: 100 g/m$^2$, thickness: 130 µm, LBKP, fiber diameter: 18 µm, manufactured by Oji Paper Co., Ltd.) as the filter material, a cellulose-fiber flat structure was produced in accordance with the method described above in the production example 1. The water permeability of the filter material was 19 ml/m$^2$·s, the initial tensile modulus was 3,800 MPa, and the residual film ratio was 96%.

Comparative Example 2

Using T100A090C (a PTFE membrane filer (pore diameter: 1.0 µm) manufactured by Advantec MFS, Inc.) as the filter material, a cellulose-fiber flat structure was produced in accordance with the method described above in the production example 2. The thickness of the filter material was 82 μm, and the water permeability was 68.0 ml/m²·s. Further, the initial tensile modulus of the filter material was 10 MPa. In terms of the surface texture of the cellulose-fiber flat structure, no surface texture derived from the knitted fabric could be confirmed, but surface texture having a pitch distance derived from the net (asperity: 118 μm, pitch: 1,039 μm) was confirmed, indicating transfer of the support texture. The results are shown in Table 1.

Comparative Example 2

Using NT20 (manufactured by Shikishima Canvas Co., Ltd.) as the filter material, a cellulose-fiber flat structure was produced in accordance with the method described above in the production example 1. The thickness of the filter material was 100 μm, and the water permeability was 136.0 ml/m²·s. Further, the initial tensile modulus of the filter material was 100 MPa. The results are shown in Table 1.

Comparative Example 3

Using PET6HD (a polyester cross-mesh, (mesh opening: 6 μm), manufactured by Semitec Corporation) as the filter material, a cellulose-fiber flat structure was produced in accordance with the method described above in the production example 1. However, no fine cellulose fibers were retained on the filter material, and the residual film ratio was 0%.

The thickness of the filter material was 80 μm, and the water permeability was 322.0 ml/m²·s. Further, the initial tensile modulus of the filter material was 400 MPa. The results are shown in Table 1.

Comparative Example 4

Using a base paper for a coffee filter (basis weight: 30 g/m², thickness: 50 μm, hemp pulp, fiber diameter: 32 μm, manufactured by Oji Specialty Paper Co., Ltd.) as the filter material, a cellulose-fiber flat structure was produced in accordance with the method described above in the production example 1. The water permeability of the filter material was 230 ml/m²·s, the initial tensile modulus was 6,500 MPa, and the residual film ratio was 23%.

From the viewpoint of practical usability, the residual film ratio shown in Table 1 must be at least 80% by weight, and is preferably at least 85% by weight, more preferably at least 90% by weight, and most preferably 95% by weight or greater.

The residual film ratio shown in Table 1 was calculated relative to a standard value of 100% for the weight of the cellulose-fiber flat structure obtained in the comparative example 1.

As illustrated in Table 1, an excellent residual film ratio was confirmed for the examples 1 to 3, and it was evident that fine cellulose fibers having an average diameter at the nano level were able to be recovered efficiently from the cellulose-fiber dispersion.

In contrast, when the PTFE filter material specifically disclosed in WO 2009/081881 was used, although a favorable residual film ratio was achieved, the texture of the filter material support material was transferred, meaning a cellulose-fiber flat structure having a favorable surface texture could not be obtained.

Further, when the filter material NT20 specifically disclosed in Japanese Laid-Open Patent Application No. 2006-316253 was used, a residual film ratio that was adequate for practical use could not be obtained. Moreover, even when a filter material PET6HD (mesh opening: 6 μm) having a smaller mesh opening than that of the 460 mesh fabric (pore diameter: approximately 20 μm×20 μm) specifically disclosed in Japanese laid-Open Patent Application No. 2006-316253 was used, a residual film ratio that was adequate for practical use could still not be obtained.

INDUSTRIAL APPLICABILITY

The present invention is able to provide a method of producing a cellulose-fiber flat structure, which can efficiently recover fine cellulose fibers from a dispersion containing fine cellulose fibers having a nano level average fiber diameter, can produce a cellulose-fiber flat structure having a favorable surface texture, and can be applied to continuous processes and the like, as well as providing a cellulose-fiber flat structure obtained using the above method, a cellulose-fiber composite obtained using the cellulose-fiber flat structure, and a method of producing the cellulose-fiber composite, and therefore the invention has significant industrial applicability.

DESCRIPTION OF THE REFERENCE SIGNS

10: Filter material supply unit
12: Dispersion supply unit

TABLE 1

| Examples Comparative examples | Name of filter material | Material of filter material | Thickness of filter material [μm] | Water permeability [ml/m²·s] | Residual film ratio [% by weight] | Initial tensile modulus [MPa] | Support transferability |
|---|---|---|---|---|---|---|---|
| Example 1 | 5025SDY | Polyester + nylon | 180 | 17.0 | 99 | 220 | A |
| Example 2 | 535CL | Polyester + nylon | 165 | 29.0 | 102 | 260 | — |
| Example 3 | 500ASCL | Polyester + nylon | 172 | 49.0 | 93 | 100 | — |
| Example 4 | — | High-quality paper | 100 | 25 | 95 | 3500 | A |
| Example 5 | — | High-quality paper | 130 | 19 | 96 | 3800 | A |
| Comparative example 1 | T100A090C | PTFE | 82 | 68.0 | 100 | 10 | B |
| Comparative example 2 | NT20 | Polyester + nylon | 100 | 136.0 | 72 | 100 | — |
| Comparative example 3 | PET6HD | Polyester | 80 | 322.0 | 0 | 400 | — |
| Comparative example 4 | — | Coffee filter base paper | 50 | 230 | 23 | 6500 | B |

14A: Vacuum chamber unit
14B: Drum-like vacuum chamber unit
14C: Vacuum unit 16: Peeling unit
18: Filter material recovery unit
20: Drying unit
22: Structure collection unit
26: Wire mesh
40: PET mesh woven fabric
42A, 42B, 42C, 42D: PETF roller
44A, 44B: Absorbent sponge roller
46: Heated roller
50A, 50B: Dispersion tank
24, 32, 52, 54, 56, 58, 62, 68, 70, 72, 74, 76, 78: Guide roller
28, 30, 60, 64, 66: Transport roller
100, 102, 104, 106: Cellulose-fiber flat structure production apparatus
W: Filter material
R: Cellulose-fiber flat structure
Z, Y: Filter fabric

The invention claimed is:

1. A method of producing a cellulose-fiber flat structure, the method comprising obtaining a cellulose-fiber flat structure by filtering a very fine cellulose-fiber dispersion containing very fine cellulose fibers having an average fiber diameter of 4 to 100 nm, using a filter material having a water permeability of not more than 100 ml/m$^2$·s and an initial tensile modulus of 20 MPa or greater, wherein the filter material is obtained by subjecting a fabric formed using a fiber having an average thread thickness of 1 to 5 d/f to a heat and pressure treatment.

2. The method of producing a cellulose-fiber flat structure according to claim 1, wherein the filter material is formed from at least one type of fiber selected from the group consisting of synthetic resin fibers, regenerated fibers and natural fibers.

3. The method of producing a cellulose-fiber flat structure according to claim 2, wherein the fiber used to form the filter material is a splittable composite fiber.

4. The method of producing a cellulose-fiber flat structure according to claim 1, wherein a thickness of the fabric is 100 μm or greater.

5. The method of producing a cellulose-fiber flat structure according to claim 1, wherein the fabric is a woven fabric, a knitted fabric or a nonwoven fabric.

6. The method of producing a cellulose-fiber flat structure according to claim 1 further comprising, prior to obtaining the cellulose-fiber flat structure by performing filtering using the filter material, performing a microfibrillation treatment on a raw material dispersion comprising a dispersed cellulose, thereby obtaining the very fine cellulose-fiber dispersion.

7. A method of producing a cellulose-fiber composite, the method comprising, in addition to obtaining a cellulose-fiber flat structure by performing filtering using the filter material defined in the method of producing a cellulose-fiber flat structure according to claim 1, complexing the cellulose-fiber flat structure and a matrix material.

8. The method of producing a cellulose-fiber flat structure according to claim 1, further comprising, prior to obtaining the cellulose-fiber flat structure by performing filtering using the filter material, performing a microfibrillation treatment on a raw material dispersion comprising a dispersed cellulose, thereby obtaining the very fine cellulose-fiber dispersion,
wherein the filter material is obtained by subjecting a fabric formed using a fiber having an average thread thickness of 1 to 5 d/f to a heat and pressure treatment,
a thickness of the fabric is 100 μm or greater, and
the fiber is a splittable composite fiber.

9. A method of producing a cellulose-fiber flat structure, the method comprising obtaining a cellulose-fiber flat structure by filtering a very fine cellulose-fiber dispersion containing very fine cellulose fibers having an average fiber diameter of 4 to 100 nm using a filter material having a water permeability of not more than 100 ml/m$^2$·s and an initial tensile modulus of 20 MPa eater, wherein the filter material is formed from a paper base material.

10. The method of producing a cellulose-fiber flat structure according to claim 9, wherein the paper base material has a thickness of 90 μm or greater.

11. The method of producing a cellulose-fiber flat structure according to claim 9, further comprising, prior to obtaining the cellulose-fiber flat structure by performing filtering using the filter material, performing a microfibrillation treatment on a raw material dispersion comprising a dispersed cellulose, thereby obtaining the very fine cellulose-fiber dispersion,
wherein the filter material is formed from a paper base material, and
the paper base material has a thickness of 90 μm or greater.

12. The method of producing a cellulose-fiber flat structure according to claim 9, wherein the method comprises, prior to obtaining the cellulose-fiber flat structure by performing filtering using the filter material, performing a microfibrillation treatment on a raw material dispersion comprising a dispersed cellulose, thereby obtaining the very fine cellulose-fiber dispersion.

13. A method of producing a cellulose-fiber composite, the method comprising, in addition to obtaining a cellulose-fiber flat structure by performing filtering using the filter material defined in the method of producing a cellulose-fiber flat structure according to claim 9, complexing the cellulose-fiber flat structure and a matrix material.

14. A filter material having a water permeability of not more than 100 ml/m$^2$·s and an initial tensile modulus of 20 MPa or greater, which is used for filtering a very fine cellulose-fiber dispersion comprising very fine cellulose fibers having an average fiber diameter of 4 to 100 nm, wherein said filter material is obtained by subjecting a fabric formed using a fiber having an average thread thickness of 1 to 5 d/f to a heat and pressure treatment.

15. A method of filtering a cellulose-fiber dispersion, the method comprising obtaining a cellulose-fiber flat structure by filtering a very fine cellulose-fiber dispersion comprising very fine cellulose fibers having an average fiber diameter of 4 to 100 nm, using a filter material having a water permeability of not more than 100 ml/m$^2$·s and an initial tensile modulus of 20 MPa or greater, wherein the filter material is obtained by subjecting a fabric formed using a fiber having an average thread thickness of 1 to 5 d/f to a heat and pressure treatment, wherein the filtering is selected from the group consisting of reduced-pressure filtering methods, normal pressure filtering methods and pressurized filtering methods.

16. A filter material having a water permeability of not more than 100 ml/m$^2$·s and an initial tensile modulus of 20 MPa or greater, which is used for filtering a very fine cellulose-fiber dispersion comprising very fine cellulose fibers having an average fiber diameter of 4 to 100 nm, wherein the filter material is formed from a paper base material.

17. A method of filtering a cellulose-fiber dispersion, the method comprising obtaining a cellulose-fiber flat structure by filtering a very fine cellulose-fiber dispersion comprising very fine cellulose fibers having an average fiber diameter of 4 to 100 nm, using a filter material having a water permeability of not more than 100 ml/m$^2$·s and an initial tensile modulus of 20 MPa or greater, wherein the filter material is formed from a paper base material having a thickness of 90 μm or greater.

* * * * *